(12) United States Patent
Fastner et al.

(10) Patent No.: US 12,405,710 B2
(45) Date of Patent: Sep. 2, 2025

(54) SYSTEMS, METHODS, AND MEDIA FOR AUTOMATICALLY OPTIMIZING MAINTENANCE

(71) Applicant: Direct Supply, Inc., Milwaukee, WI (US)

(72) Inventors: Charles W. Fastner, Pewaukee, WI (US); Suzanne M. Lieven, Cedarburg, WI (US)

(73) Assignee: Direct Supply, Inc., Milwaukee, WI (US)

( * ) Notice: Subject to any disclaimer, the term of this patent is extended or adjusted under 35 U.S.C. 154(b) by 0 days.

(21) Appl. No.: 18/125,578

(22) Filed: Mar. 23, 2023

(65) Prior Publication Data

US 2023/0229985 A1    Jul. 20, 2023

Related U.S. Application Data

(63) Continuation of application No. 17/849,380, filed on Jun. 24, 2022, now Pat. No. 11,620,037.

(Continued)

(51) Int. Cl.
*G06F 3/0484* (2022.01)
*G06F 3/0482* (2013.01)
(Continued)

(52) U.S. Cl.
CPC .......... *G06F 3/0484* (2013.01); *G06F 3/0482* (2013.01); *G06F 3/0488* (2013.01);
(Continued)

(58) Field of Classification Search
CPC .... G06F 3/0484; G06F 3/0482; G06F 3/0488; H04N 7/183
See application file for complete search history.

(56) References Cited

U.S. PATENT DOCUMENTS

| 7,664,667 B1 | 2/2010 | Ruppelt et al. |
| 10,685,308 B1 | 6/2020 | Avery, Jr. et al. |

(Continued)

FOREIGN PATENT DOCUMENTS

CA    2932198 A1    12/2016

OTHER PUBLICATIONS

FMX Learning Center, FMX Administrator Maintenance, Technology, and Custom Work Request Module Guide, Retrieved from https://web.archive.org/web/20170308061228/https://help.gofmx.com/hc/en-us/articles/207050896-FMX-Administrator-Maintenance-Technology-and-Custom-Work-Request-Module-Guide, 2017, 7 pages.

*Primary Examiner* — Daniel W Parcher
(74) *Attorney, Agent, or Firm* — Perkins Coie LLP

(57) ABSTRACT

In accordance with some embodiments of the disclosed subject matter, mechanisms (which can, for example, include systems, methods, and media) for maintaining components of a unit are provided. In some embodiments, a method comprises: receiving an indication that a unit is ready to be turned; generating a customized user interface for assessment of the unit based on a template; receiving a request, from a remote computing device, for the user interface; causing the remote device to present the user interface; receiving, via the remote device, input indicating that a component should be replaced; receiving, from the remote device, an image of the component; receiving, from a second remote computing device associated with a designated user, input indicating that replacement of the first component is approved; and causing a notification to be presented via the remote computing device indicating that replacement of the first component is approved.

23 Claims, 24 Drawing Sheets

Related U.S. Application Data

(60) Provisional application No. 63/214,705, filed on Jun. 24, 2021.

(51) Int. Cl.
    *G06F 3/0488*     (2022.01)
    *G06Q 10/0631*     (2023.01)
    *H04N 7/18*     (2006.01)

(52) U.S. Cl.
    CPC ............... *G06Q 10/063112* (2013.01); *G06Q 10/063114* (2013.01); *H04N 7/183* (2013.01)

(56) References Cited

U.S. PATENT DOCUMENTS

| | | | |
|---|---|---|---|
| 10,977,881 B1* | 4/2021 | Buentello | G06Q 20/405 |
| 11,055,797 B1* | 7/2021 | Carone | G06Q 50/163 |
| 2009/0063202 A1 | 3/2009 | Becerra et al. | |
| 2009/0216552 A1 | 8/2009 | Watrous | |
| 2010/0023352 A1* | 1/2010 | Smith | G06Q 10/06 705/7.42 |
| 2013/0054276 A1 | 2/2013 | Hamann | |
| 2013/0290052 A1* | 10/2013 | Settino | G06Q 50/16 705/7.15 |
| 2014/0359677 A1 | 12/2014 | Ogle | |
| 2015/0302414 A1* | 10/2015 | Cox | G06Q 20/127 705/7.19 |
| 2019/0102753 A1* | 4/2019 | Harrison | G06Q 10/06311 |
| 2021/0056509 A1 | 2/2021 | Lindy | |
| 2021/0089940 A1 | 3/2021 | Lin et al. | |
| 2022/0374030 A1* | 11/2022 | Lehtonen | B01F 33/846 |

\* cited by examiner

To Sign-off
930

✓ Housekeeping Deep Clean

932 →

◉ Note required  ○ Picture required    [REMOVE INSTRUCTIONS]  [DELETE]

Housekeeping staff completes deep clean of the unit:
* Clean walls, marks on ceiling, doors and door tracks
* Wipe down base cove moldings and trim moldings
* Wipe down all outlets and switches
* Wash windows and clean all sills, woodwork and door jams
* Clean light fixtures
* Wipe down counters and cabinets
* Clean appliances, hood fan and filter
* Clean toilets, sinks, shower, bath and scrub tile
* Mop, sweep and vacuum floors ✓ Marketing Sign-Off ◉ Note required  ○ Picture required    [REMOVE INSTRUCTIONS]  [DELETE]

Marketing staff confirms unit is ready to be rented after completing unit walk through.

[+ ADD ITEM]
934

ITEMS TO COMPLETE

990 ↘

● Cabinets ⊙   Good   View Note

ITEMS TO SIGN-OFF

◯ Housekeeping Deep Clean ⊙   Add Note

◯ Marketing Sign-Off ⊙   Add Note

TOTAL COST   $0.00

FIG. 9K

SYSTEMS, METHODS, AND MEDIA FOR AUTOMATICALLY OPTIMIZING MAINTENANCE

CROSS-REFERENCE TO RELATED APPLICATIONS

This application is a continuation of U.S. application Ser. No. 17/849,380, filed Jun. 24, 2022, which is based on, claims the benefit of, and claims priority to U.S. Provisional Application No. 63/214,705, filed Jun. 24, 2021, both of which are hereby incorporated herein by reference in their entirety for all purposes.

BACKGROUND

Operators of senior living facilities often operate multiple facilities over a large geographic area. Performing maintenance and repair of assets at each facility is often delegated to a maintenance director, or other local employee that can be on site at the facility. Additionally, when a unit becomes vacant, the same employee may be responsible for making any repairs that are needed to get the unit ready for a new resident. However, a maintenance director may not be able to perform all of the service tasks that are needed, and can be responsible for hiring contractors to perform at least some services. In a senior living setting, or other setting in which health and safety are of paramount importance, properly maintaining facilities is an important task, which can result in lost revenue, fines and other adverse consequences if not facilities are not adequately maintained. This may cause maintenance employees to err on the side of hiring an outside contractor to ensure that maintenance is performed properly. Thus, facility maintenance can become a costly endeavor, especially when an operator operating many facilities does not have mechanisms for controlling costs.

Accordingly, new systems, methods, and media for automatically optimizing maintenance are desirable.

SUMMARY

In accordance with some embodiments of the disclosed subject matter, systems, methods, and media for automatically optimizing maintenance are provided.

In accordance with some embodiments of the disclosed subject matter, a method for maintaining components of a unit is provided, the method comprising: receiving an indication that a unit is ready to be turned over; generating a customized user interface for assessment of the unit based on a template associated with the unit; retrieving information about a prior condition of one or more components associated with the unit, wherein the prior condition of each of the one or more components is associated with a time; retrieving information associated with a most recent occupant of the unit, including a length of occupancy; receiving a request, from a remote computing device, for the customized user interface; causing a link to the information about a condition of one or more components associated with the unit to be included in the customized user interface; causing the remote computing device to present the customized user interface; receiving, via the remote computing device, input indicating that a current condition of the first component indicates that the first component should be replaced; receiving, from the remote computing device, an image of the first component; determining that the first component is not due for replacement; in response to a disagreement between the input indicating that the first component should be replaced and the determination that the first component is not due for replacement, causing an authorization request to be presented to a designated user, wherein the authorization request includes the information about a prior condition of the first component, and the image of the first component; receiving, from a second remote computing device associated with the designated user, input indicating that replacement of the first component is authorized; and causing a notification to be presented via the remote computing device indicating that replacement of the first component is authorized.

In some embodiments, the customized user interface is configured to: prompt a user of the remote computing device to provide input indicative of a current condition of the one or more components, and prompt the user of the remote computing device to capture an image of a first component of the one or more components.

In some embodiments, the method further comprises: estimating a current condition of the first component based on the prior condition of the first component, a time that has elapsed since the prior condition of the first component, the information associated with the most recent resident of the unit, and information about an average useful life of the first component in units similar to the unit; determining, based on the estimated condition, that the first component is not due for replacement; and in response to a disagreement between the input indicating that the first component should be replacement and the determination that the first component is not due for replacement, causing the authorization request to be presented to the designated user.

In some embodiments, the method further comprises: determining, based on an age of the first component and a standard indicative of a minimum age for replacement, that the first component is not due for replacement; and in response to a disagreement between the input indicating that the first component should be replacement and the determination that the first component is not due for replacement, causing the authorization request to be presented to the designated user.

In some embodiments, retrieving information about a most recent occupant of the unit comprises: requesting information associated with the most recent occupant from an electronic health record system.

In some embodiments, the information associated with the most recent occupant includes an indication of whether the most recent occupant uses a motorized wheelchair.

In some embodiments, the first component is carpet.

In some embodiments, the method further comprises: receiving a request to create the template; receiving input indicating one or more types of facilities to associate with the template; receiving input indicating that a plurality of types of components are to be assessed when turning over a unit; and receiving input indicating that at least one image is required in connection with assessment of a first type of components.

In some embodiments, receiving the indication that the unit is ready to be turned over comprises: receiving an indication from an electronic health records system that a current occupant of the unit has vacated the unit.

In some embodiments, the method further comprises: receiving an indication that a second unit is ready to be turned over; determining, without user intervention, a priority for the unit and the second unit; and prompting a user of the remote computing device to prioritize the unit based on the priority.

In some embodiments, determining the priority for the unit and the second unit comprises: providing information associated with the unit to a machine learning model; providing information associated with the unit to the machine learning model; and receiving output from the machine learning model indicative of the priority for the unit and the second unit.

In some embodiments, the unit is a unit in a senior living facility, and the information about the average useful life of the first component in units similar to the unit comprises information about the average useful life of the first component in senior living facilities.

In some embodiments, the method further comprises: receiving a request to create the template; receiving input indicating that the template is to be associated with senior living; in response to the input indicating that the template is to be associated with senior living, causing a preconfigured template associated with senior living to be presented; causing a plurality of types of components associated with the preconfigured template to be presented; and receiving input indicating that at least one image is required in connection with assessment of a first type of components.

In some embodiments, the method further comprises: estimating a current condition of a second component based on the prior condition of the second component, a time that has elapsed since the prior condition of the second component, the information associated with the most recent resident of the unit, and information about an average useful life of the second component; determining, based on the estimated condition, that the second component is not due for replacement; and causing a recommendation to repair the second component to be presented to the user of the remote device based on the determination that the second component is not due for replacement.

In some embodiments, the method further comprises: estimating a cost to replace the second component; estimating a cost to repair the second component; and determining that repair of the second component is recommended based on the estimated cost to replace the second component and the estimated cost to repair the second component.

In some embodiments, the method further comprises: in response to receiving the input indicating that replacement of the first component is authorized, automatically generating an order for a replacement for the first component.

In some embodiments, the method further comprises: in response to receiving the input indicating that replacement of the first component is authorized, automatically scheduling a third party service provider to replace the first component.

In some embodiments, the method further comprises: receiving an indication that a second unit is ready to be turned over; generating a second customized user interface for assessment of the second unit based on the template; retrieving information about a prior condition of one or more components associated with the second unit, wherein the prior condition of each of the one or more components is associated with a time; receiving a request, from a remote computing device, for the customized user interface; causing the remote computing device to present the customized user interface, wherein the customized user interface is configured to: prompt a user of the remote computing device to provide input indicative of a current condition of the one or more components, and prompt the user of the remote computing device to capture an image of the first component of the one or more components; receiving, from the remote computing device, an image of the first component; estimating a current condition of the first component based on the prior condition of the first component, a time that has elapsed since the prior condition of the first component, the information associated with the most recent resident of the unit, and information about an average useful life of the first component in units similar to the unit; determining, based on the estimated condition, that the first component is due for replacement; in response to the determination that the first component is due for replacement, automatically authorizing replacement of the first component; causing a notification to be presented via the remote computing device indicating that replacement of the first component is authorized.

In some embodiments, the method further comprises: causing the remote computing device to present, via the customized user interface, a user interface element that prompts a user to provide input indicative of the current condition of the first component; and causing the remote computing device to present, via the customized user interface, information indicative of a most recent replacement of the first component in connection with the user interface element that prompts a user to provide input indicative of the current condition of the first component.

In some embodiments, the method further comprises: receiving, via the customized user interface, an indication that replacement of the first item has been completed; and causing a notification to be presented via a third remote computing device indicating that replacement of the first component has been completed.

In some embodiments, the third remote computing device is associated with a user affiliated with the facility.

In some embodiments, the method further comprises: receiving, via the customized user interface, an indication that the unit is ready for occupancy; and causing a notification to be presented via a third remote computing device indicating that the unit is ready for occupancy.

In some embodiments, the method further comprises: determining that repair of a second component associated with the unit is recommended; determining that a user associated with the remote computing device is capable of performing the repair of the second component; and prompting the user associated with the remote computing device to repair the second component.

In some embodiments, the method further comprises: identifying a plurality of service providers capable of replacing the first component; selecting one or more of the plurality of service providers based on performance of the respective service provider in facilities similar to a facility associated with the unit.

In some embodiments, the method further comprises: receiving a realized cost to replace the first component; cause the cost to be presented within the customized user interface; and cause a total cost associated with turning over the unit to be presented within the customized user interface, wherein the total cost includes one or more realized costs and one or more estimated costs.

In accordance with some embodiments of the disclosed subject matter, a system for maintaining components of a unit using a customized graphical user interface is provided, the system comprising: a camera; a touchscreen display; a communication system including at least one transceiver; and at least one processor programmed to: receive, from a server, a message that includes instructions to a user associated with the system to complete an assessment of a unit; receive, from the server, instructions that cause the at least one processor to present, via the touchscreen display, a customized user interface that includes a plurality of selectable user interface elements each associated with a component to be assessed of a plurality of components, the plurality of components including at least an appliance, flooring, and one or more fixtures; present, via the touchscreen display, the customized user interface; receive, via the touchscreen display, selection of a first selectable user interface element of the plurality of selectable user interface elements; in response to receiving the selection of the first selectable user interface element, instruct, via the touchscreen, the user to capture at least one image of an appliance associated with the first selectable user interface element; capture, using the camera, at least a first image of the appliance; present, via the touchscreen, a user interface portion that includes a second plurality of selectable user interface elements, each of the second plurality of selectable user interface elements associated with a condition of the appliance; receive, via the touchscreen, selection of a particular selectable user interface element of the second plurality of user interface elements; update, based on the selection of the second user interface element, a status of the appliance in the customized user interface to reflect the condition associated with the particular selectable user interface element; transmit, to the server via the communication system, the at least one image and the condition associated with the appliance; present, via the touchscreen display, an updated customized user interface including tasks to be performed by the user; receive, via the touchscreen display, input indicting completion of a first task; and transmit, to the server via the communication system, an indication that the first task has been completed.

In some embodiments, the at least one processor is further programmed to: in response to receiving the selection of the first selectable user interface element, cause a portion of the customizable user interface to be presented that includes a field for inputting notes, and a selectable photo user interface element; receive, via the touchscreen display, a selection of the photo user interface element; in response to receive the selection of the photo user interface element, launch a camera application usable to capture the at least one image of the appliance; and receive input to cause the camera to capture the first image.

In some embodiments, the plurality of components includes at least one heating system, and at least one electrical system.

In accordance with some embodiments of the disclosed subject matter, a method for maintaining components of a unit using a customized graphical user interface is provided, the method comprising: receiving, from a server, a message that includes instructions to a user associated with the system to complete an assessment of a unit; receiving, from the server, instructions that cause the at least one processor to present, via the touchscreen display, a customized user interface that includes a plurality of selectable user interface elements each associated with a component to be assessed of a plurality of components, the plurality of components including at least an appliance, flooring, and one or more fixtures; presenting, via a touchscreen display, the customized user interface; receiving, via the touchscreen display, selection of a first selectable user interface element of the plurality of selectable user interface elements; in response to receiving the selection of the first selectable user interface element, instructing, via the touchscreen, the user to capture at least one image of an appliance associated with the first selectable user interface element; capturing, using a camera, at least a first image of the appliance; presenting, via the touchscreen, a user interface portion that includes a second plurality of selectable user interface elements, each of the second plurality of selectable user interface elements associated with a condition of the appliance; receiving, via the touchscreen, selection of a particular selectable user interface element of the second plurality of user interface elements; updating, based on the selection of the second user interface element, a status of the appliance in the customized user interface to reflect the condition associated with the particular selectable user interface element; transmitting, to the server via a communication system comprising at least one transceiver, the at least one image and the condition associated with the appliance; presenting, via the touchscreen display, an updated customized user interface including tasks to be performed by the user; receiving, via the touchscreen display, input indicting completion of a first task; and transmitting, to the server via the communication system, an indication that the first task has been completed.

In accordance with some embodiments of the disclosed subject matter, a non-transitory computer readable medium containing computer executable instructions that, when executed by a processor, cause the processor to perform a method for maintaining components of a unit using a customized graphical user interface is provided, the method comprising: receiving, from a server, a message that includes instructions to a user associated with the system to complete an assessment of a unit; receiving, from the server, instructions that cause the at least one processor to present, via the touchscreen display, a customized user interface that includes a plurality of selectable user interface elements each associated with a component to be assessed of a plurality of components, the plurality of components including at least an appliance, flooring, and one or more fixtures; presenting, via a touchscreen display, the customized user interface; receiving, via the touchscreen display, selection of a first selectable user interface element of the plurality of selectable user interface elements; in response to receiving the selection of the first selectable user interface element, instructing, via the touchscreen, the user to capture at least one image of an appliance associated with the first selectable user interface element; capturing, using a camera, at least a first image of the appliance; presenting, via the touchscreen, a user interface portion that includes a second plurality of selectable user interface elements, each of the second plurality of selectable user interface elements associated with a condition of the appliance; receiving, via the touchscreen, selection of a particular selectable user interface element of the second plurality of user interface elements; updating, based on the selection of the second user interface element, a status of the appliance in the customized user interface to reflect the condition associated with the particular selectable user interface element; transmitting, to the server via a communication system comprising at least one transceiver, the at least one image and the condition associated with the appliance; presenting, via the touchscreen display, an updated customized user interface including tasks to be performed by the user; receiving, via the touchscreen display, input indicting completion of a first task; and transmitting, to the server via the communication system, an indication that the first task has been completed.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 9C shows an example of a user interface for editing instructions and documentation requirements associated with an activity in accordance with some embodiments of the disclosed subject matter.

FIG. 9E shows an example of a user interface for filtering units presented in a summary in accordance with some embodiments of the disclosed subject matter.

FIG. 9I shows yet another example of a customized user interface for optimizing maintenance associated with a unit turn in accordance with some embodiments of the disclosed subject matter.

FIG. 9K shows an example of a user interface updated based on a specified condition of an asset associated with a unit turn in accordance with some embodiments of the disclosed subject matter.

DETAILED DESCRIPTION

In accordance with various embodiments, mechanisms (which can, for example, include systems, methods, and media) for automatically optimizing maintenance are provided.

In some embodiments, mechanisms described herein can facilitate automatic optimization of maintenance at multiple facilities associated with an operator and one or more property owners. For example, mechanisms described herein can generate a customized user interface that facilitates planning and execution of maintenance for a unit turn. In such an example, mechanisms described herein can automatically generate an approval request for certain tasks (e.g., replacement of an asset) when certain criteria are met, and can automatically approve other tasks. The approval request can include information that an operator needs to make a decision of whether to approve a replacement of an asset that may incur a substantial cost. In some embodiments, mechanisms described herein can provide a technological platform that can automate aspects of facility maintenance that facilitate control over expenses for an operator with geographically disbursed facilities that is not feasible manually. An asset can include anything associated with a unit that may require maintenance, repair, or replacement. For example, assets can include appliances, fixtures (e.g., kitchen cabinets, a countertop, toilets, sinks, plumbing, etc.), flooring (e.g., carpet, tile, hardwood flooring, laminate flooring, etc.), furniture, walls, paint on walls or other surfaces, etc. Many terms can be used to refer to an asset associated with a unit, for example, assets can be items associated with a unit, components associated with a unit, etc.

Figure 1:
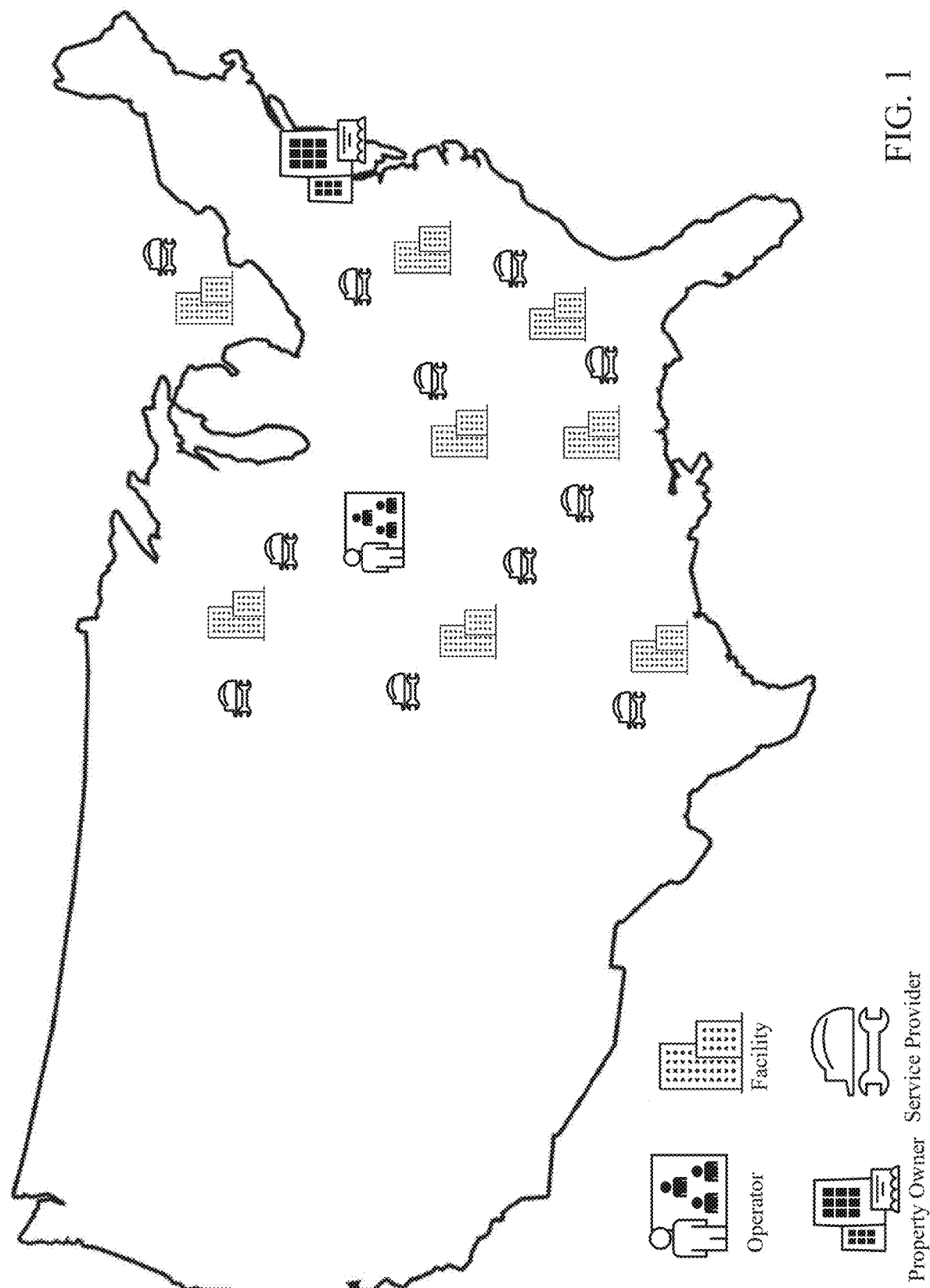
FIG. 1 shows an example of a geographically distributed network of facilities at which a service is managed by an operator in accordance with some embodiments of the disclosed subject matter.

FIG. 1 shows an example of a geographically distributed network of facilities at which a service is managed by an operator in accordance with some embodiments of the disclosed subject matter. As shown in FIG. 1, an operator located in a particular geographic location can operate facilities in many different geographical locations. For example, the operator can provide access to living space (e.g., via leased units) and/or provide a service (e.g., assistance with various tasks, healthcare services, etc.) at the various facilities. In the context of senior living, an operator may operate many different facilities in different locations, and may provide multiple different types of services, sometimes within the same facility. The operator of the facilities may or may not own the property associated with the facilities. For example, one or more property owners may own the real property and/or structures associated with the facility, and may contract with an operator to operate a senior living facility providing one or more services at the property. The property owner may be any type of organization, such as a real estate investment trust (REIT).

As part of operating a facility, the operator may be responsible for maintenance of facilities. The operator may hire one or more employees (sometimes referred to herein as a maintenance director) to supervise maintenance at a particular facility, or a group of closely located facilities. The maintenance director may be responsible for resolving requests for maintenance and/or repair to occupied units, ensuring that various assets, such as systems (e.g., heat, air conditioning, plumbing, electrical, etc.) are maintained in working order, and that other assets (e.g., carpet, doors, trim, countertops, appliances, etc.) are maintained in good repair. While a maintenance director may be capable of performing some maintenance, repair, and/or replacement, but may need to hire outside contractors to perform certain tasks. Often, contractors operate in relatively small areas, and thus different facilities may not be able to use the same contractors. This can make it difficult for the operator to ensure that contractors that are retained are charging appropriately for services and performing satisfactorily.

Figure 2A:
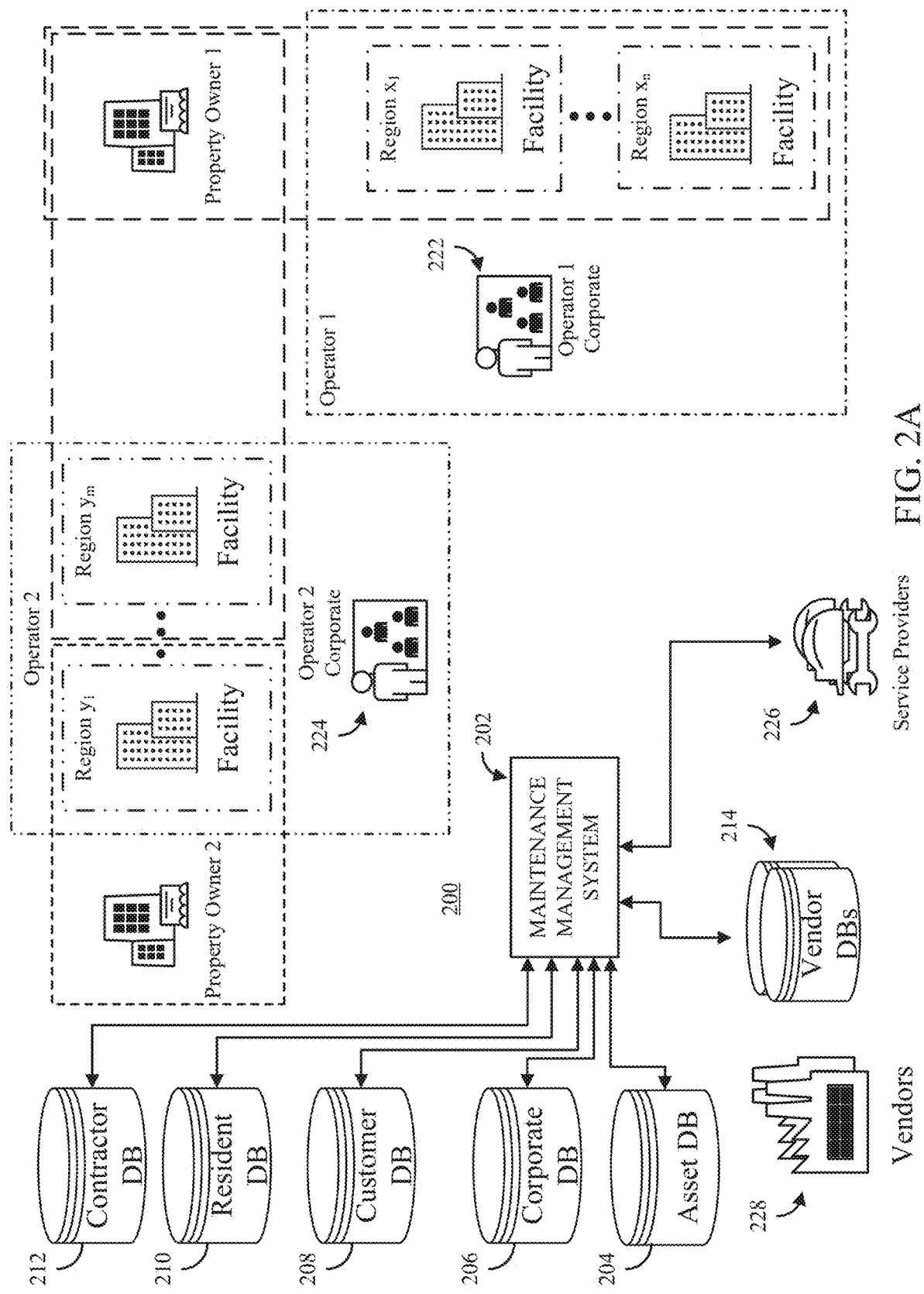
FIG. 2A shows an example of a system for automatically optimizing maintenance at facilities associated with various operators and property owners in accordance with some embodiments of the disclosed subject matter.

FIG. 2A shows an example 200 of a system for automatically optimizing maintenance at facilities associated with various operators and property owners in accordance with some embodiments of the disclosed subject matter. As shown in FIG. 2A, a maintenance management system 202 can communicate with and/or maintain various databases, such as an asset database 204, a corporate database 206, a customer database 208, a resident database 210 (and/or electronic health records system, which may be sometimes referred to as an electronic medical records system), a contractor database 212, and/or one or more vendor databases 214.

In some embodiments, asset database 204 can include asset history data associated with various facilities, such as assets associated with a first operator 222 (e.g., operator 1), and/or a second operator 224 (e.g., operator 2). In some embodiments, asset database can include information about any suitable type of asset, such as assets that can be associated with a unit, such as walls, ceiling, trim, paint (e.g., wall paint), doors, windows, window treatments, floors, carpets, plumbing, electrical wiring, electrical outlets, a heating system, a cooling system, detectors (e.g., smoke detectors, carbon monoxide detectors, etc.), fire extinguishers, appliances, cabinets, counter tops, sinks, toilets, shower, bath tub, garbage disposal, furniture, etc. Asset database 204 can include information organized using any suitable technique or combination of techniques. For example, asset database 204 can be organized as a relational database, or a non-relational database.

In some embodiments, asset database 204 can receive identifying information associated with an asset, and can store the identifying information in connection with metadata related to the asset. For example, a mobile device (e.g., computing device 330 described below in connection with FIG. 3) can scan a symbol (e.g., a barcode, a QR code, etc.) encoded with identifying information (e.g., an alphanumeric code), and can transmit the identifying information to asset database 204. In such an example, the mobile device can transmit information about the asset (e.g., an asset type, a semantically meaningful name, a location of the object, an indication of when the asset was installed, etc.).

In some embodiments, asset database 204 can store information about assets that have been installed at a facility, and metadata related to the asset. Additionally, in some embodiments, asset database 204 can store information about repairs and/or other maintenance performed in connection with an asset. For example, asset database 204 can store identifying information associated with various assets, such as unique identifying information (e.g., assigned by maintenance management system 202), semantically meaningful name, an identification number associated with a type of asset (e.g., types of assets can be associated with a unique alphanumeric code), model information, serial number, lot information, manufacturer, etc.

As another example, asset database 204 can store identifying information associated with a location of an asset, such as an address, a facility name, a room number, an apartment number, a corridor number, a type of facility (e.g., assisted living, independent living, memory care, skilled nursing, acute care, hospitality, etc.), etc. As yet another example, asset database 204 can store information associated with installation, maintenance, and/or repair of an asset, such as an installation time, a time in service (e.g., a time since the asset was installed). As still another example, asset database 204 can store information about a condition of the asset at a particular time (e.g., documented by an employee, documented by a contractor, etc.). In a more particular example, the condition of the asset can be based on one or more objective criteria, such as "new" when the asset is first installed, and/or one or more subjective criteria (e.g., based on input from a user). As a further example, asset database 204 can store information associated with a resident of a room, such as whether one or more residents uses any mobility assistance devices (e.g. a wheelchair, a motorized wheelchair, etc.), an age of the resident, a number of residents, etc. As another further example, asset database 204 can store information indicative of attributes of an asset, such as color, size, voltage, gas type (e.g., natural gas, propane, etc.), etc.

In some embodiments, when an asset is serviced (e.g., installed, repaired, or replaced, and/or when maintenance is performed), a computing device (e.g., a mobile device) can provide information associated with the service to asset database 204. In some embodiments, maintenance management system 202 and/or any other suitable system, can use information stored in asset database to predict a useful life of a particular asset. For example, maintenance management system 202 can determine an average useful life of a particular asset and/or type of asset based on a condition of similar assets over time in similar situations (e.g., in similar facilities, with residents having similar characteristics, etc.).

In some embodiments, corporate database 206 can store one or more templates associated with an operator (e.g., an operator of senior living facilities), standards associated with the operator, approval policies associated with the operator, and/or any other suitable information that can be used to automatically optimize and/or manage maintenance for the operator. In some embodiments, a separate data structure (e.g., a different instance of corporate database 206) can be associated with different operators. For example, first operator 222 can be associated with a first corporate database instance and second operator 224 can be associated with a second corporate database instance. In such an example, the different database instances may or may not be implemented by the same hardware (e.g., one or more servers). As described below in connection with FIGS. 2B, 5, 7, and 9A-9C, a template associated with an operator can be used to generate a customized user interface that can be used to optimize maintenance for a unit turn.

In some embodiments, corporate database 206 can store information indicative of tasks that can be performed by one or more employees associated with an operator and/or a particular facility. For example, corporate database 206 can store information indicative of tasks that have been successfully performed by a particular employee, tasks that the employee has been trained to perform, tasks that similar employees (e.g., with similar levels of experience, training, etc.) are able to perform, etc.

In some embodiments, customer database 208 can store information about units associated with an operator and/or one or more facilities. A unit can be any suitable portion of a facility, such as an apartment, a suite, a room, a bed, etc. In some embodiments, customer database 208 can store any suitable information about one or more units, such as information indicative of a type of unit (e.g., a number of bedrooms, a number of bathrooms, etc.), information about a price associated with the unit (e.g., rent, price, etc.), size information (e.g., total area, such as square feet or square meter), occupant information (e.g., identifying information of one or more occupants, a number of occupants, a number of pets, a type associated with each pet, etc.), attributes of the unit (e.g., location on the property, such as close to communal dining room; whether the unit has a balcony; quality of fixtures (e.g., low end, high-end, etc.; whether the unit has a bathtub, a shower stall, etc.; whether the unit is wheelchair accessible; whether the unit has grab bars installed, e.g., in the bathroom; and/or any other suitable attributes), and/or any other suitable information about the unit.

In some embodiments, resident database 210 can store information about one or more residents of a facility. In some embodiments, resident database 210 can be maintained as part of an electronic health record system and/or can be populated using information from an electronic health record system. In some embodiments, the electronic health record system can be used by an organization and/or facility to securely store and maintain protected health information about patients and/or residents at the facility. Additionally or alternatively, in some embodiments, resident database 210 can be used by an organization and/or facility to securely store and maintain information that is not classified In some embodiments, resident database 210 can be used to securely store and maintain information that may not be considered protected health information about patients. In some embodiments, any suitable information about residents can be stored using resident database 210, such as information about the resident's needs and/or preferences (e.g., permission to access unit, wheelchair needs, grab bar needs, dietary needs, dietary preferences, etc.), a length of occupancy, etc.

In some embodiments, resident database 210 can be maintained as part of maintenance management system 202 and/or can be maintained separately (e.g., as part of a health information system, by a third party, etc.) and used by maintenance management system 202. In some embodiments, system 200 can include multiple resident databases 210 which can be maintained by different entities, and which can include information about different residents, and/or can include different types of information about the same residents.

In some embodiments, contractor database 212 can store information about one or contractors 226 (e.g., service providers). In some embodiments, contractor database 212 can store any suitable information about one or more service providers, such as identifying information associated with a service provider, information indicative of a service area associated with a service provider, information indicative of cost to perform one or more services (e.g., to perform installation, maintenance, repair, and/or replacement of one or more assets), information indicative of response times, information indicative of satisfactory performance, information indicative of services performed at various types of facilities (e.g., assisted living, independent living, memory care, skilled nursing, acute care, hospitality, etc.), information indicative of satisfactory performance at various types of facilities (e.g., assisted living, independent living, memory care, skilled nursing, acute care, hospitality, etc.), information indicative of training and/or certification completed by of service provider and/or one or more employees of a service provider.

In some embodiments, vendor databases 214 can store information about one or more items available from one or more vendors 228 (e.g., suppliers, manufacturers, retailers, wholesalers, etc.) In some embodiments, maintenance management system 202 (and/or any other suitable system, such as an order management system described in U.S. Pat. No. 10,685,308, issued Jun. 16, 2020, which is hereby incorporated herein by reference in its entirety), can collect information about products that are stocked and/or are generally available in various regions in which one or more vendors operates. In some embodiments, maintenance management system 202 (and/or any other suitable system) can query vendor databases 214 for information about inventory currently available in one or more regions, and can facilitate procurement of one or more parts needed to perform a particular service. Additionally, in some embodiments, maintenance management system 202 can use information from vendor databases 214 to determine a useful life for assets, which can be used when evaluating whether to recommend Note that, in some embodiments, information stored in asset database 204, corporate database 206, customer database 208, resident database 210 (and/or electronic health records system), contractor database 212, and/or vendor databases 214 can be stored in a distributed database and/or distributed record that is maintained across various computing devices in a network of computing devices. For example, in some embodiments, such data can be stored using blockchain techniques to store and update data in an encrypted and distributed record. As another example, such data can be stored using a secured and encrypted database (e.g., implemented using relational and/or non-relational data stores) to securely store and update data.

Figure 2B:
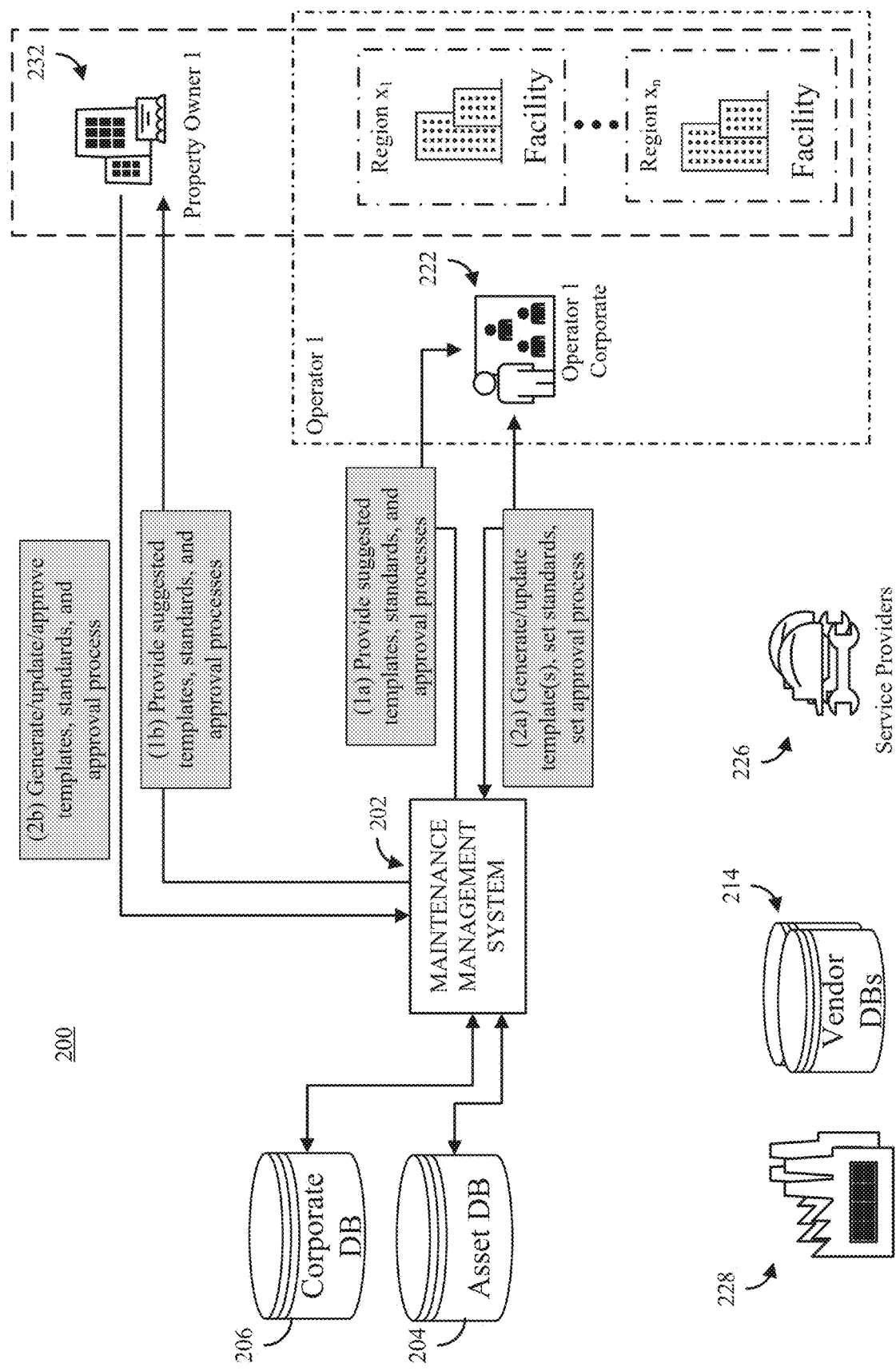
FIG. 2B shows an example of a system for automatically optimizing maintenance generating a customizable template user interface useable for optimizing maintenance at facilities associated with various operators and property owners in accordance with some embodiments of the disclosed subject matter.

FIG. 2B shows an example of a system for automatically optimizing maintenance generating a customizable template user interface useable for optimizing maintenance at facilities associated with various operators and property owners in accordance with some embodiments of the disclosed subject matter. As shown in FIG. 2B, in some embodiments, maintenance management system 202 can provide (at (1a)) one or more suggested templates, standards, and/or approval processes that can be used to automatically optimize maintenance at facilities associated with operator 222. For example, maintenance management system 202 can provide the suggested templates, standards, and/or approvals via a computing device associated with operator 222. Additionally or alternatively, in some embodiments, maintenance management system 202 can provide (e.g., at (1a)) a user interface that can be used to generate a template, standards, and/or approval processes (e.g., in addition to, or in lieu of, providing suggested templates, standards, and/or approvals).

In some embodiments, operator 222 can provide input (at (2a)) that can cause maintenance management system 202 to generate and/or update one or more templates, to set standards, and/or to set one or more approval processes. For example, as described below in connection with FIGS. 9A to 9C, a user can provide input (e.g., via a user interface) specifying assets to be included in a template, whether notes are required to be entered (and/or for which condition levels of an asset), whether an image is required to be captured (and/or for which condition levels of an asset), instructions to be followed when assessing condition of an item, etc. Additionally, operator 222 can specify which type(s) of facility the template is to be associated with, which type(s) of unit the template is to be associated with, etc.

In some embodiments, maintenance management system 202 can generate and store the template based on input received from operator 222. For example, maintenance management system 202 can store the template (e.g., instructions that can be used to generate a customized user interface) using corporate database 206.

Additionally or alternatively, in some embodiments, maintenance management system 202 can provide (at (1b)) one or more suggested templates, standards, and/or approval processes that can be used to automatically optimize maintenance at facilities associated with a property owner 232 (e.g., which may own properties at which operator 222 operates facilities, and/or additional properties). In some embodiments, property owner 232 can provide input (e.g., at (2b)) that can cause maintenance management system 202 to generate and/or update one or more templates, to set standards, and/or to set one or more approval processes. For example, as described below in connection with FIGS. 9A to 9C, a user associated with property owner 232 can provide input (e.g., via a user interface) specifying assets to be included in a template, whether notes are required to be entered (and/or for which condition levels of an asset), whether an image is required to be captured (and/or for which condition levels of an asset), instructions to be followed when assessing condition of an item, etc. Additionally, property owner 232 can specify which type(s) of facility the template is to be associated with, which type(s) of unit the template is to be associated with, etc.

In some embodiments, in addition to, or in lieu of, generating one or more templates, setting one or more standards, and/or setting one or more approval processes at (2b), property owner 232 can: modify and/or approve a template; set additional standards, modify standards set by operator 222, and/or approve standards set by operator 222; and/or set additional approval processes, modify approval processes set by operator 222, and/or approve approval processes set by operator 222.

Figure 2C:
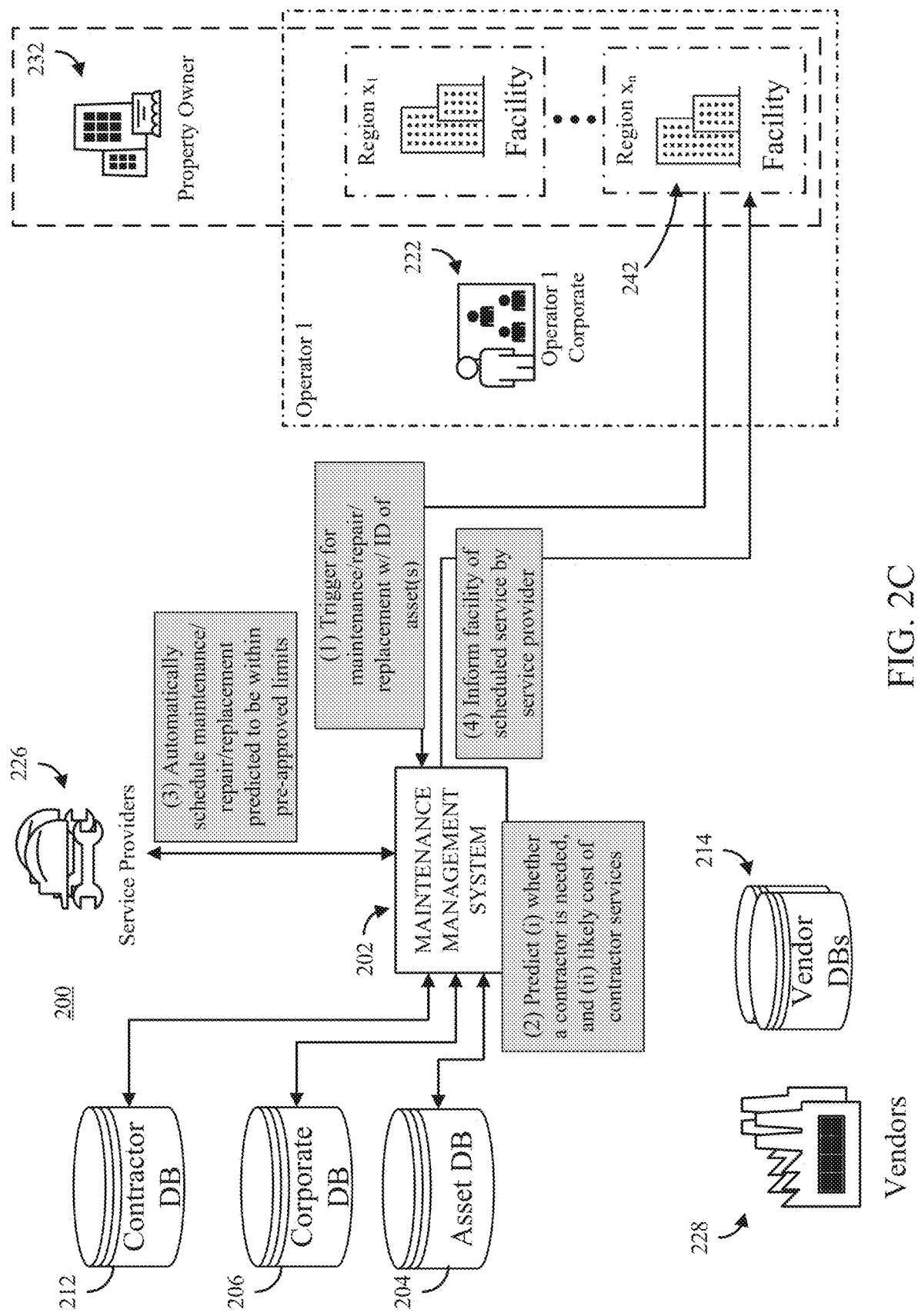
FIG. 2C shows an example of a system for automatically optimizing maintenance automatically scheduling service at a facility by a third party service provider in accordance with some embodiments of the disclosed subject matter.

FIG. 2C shows an example of a system for automatically optimizing maintenance automatically scheduling service at a facility by a third party service provider in accordance with some embodiments of the disclosed subject matter. As shown in FIG. 2C, in some embodiments, maintenance management system 202 can receive (e.g., at (1)) a communication from a facility 242 (e.g., from a computing device associated with facility 242, such as a computing device local to facility 242, or a computing device remote from facility 242) indicating that maintenance, repair, and/or replacement of one or more assets may be needed. In some embodiments, the trigger received at (1) can be associated with information that can be used to identify an asset(s) associated with the trigger (e.g., information indicative of a type of asset, information indicative of a location of the asset, identifying information associated with the asset, etc.).

In some embodiments, the trigger can be any suitable communication, such as maintenance request from a resident of the facility, an indication that maintenance, repair, and/or replacement of an asset is needed from an employee associated with the facility (e.g., provided during a unit turn, or at any other suitable time). Additionally or alternatively, in some embodiments, maintenance management system 202 can determine that maintenance is due to be performed on an asset without receiving a triggering communication from facility 242. For example, maintenance management system 202 can determine that maintenance is due to be performed based on a time interval from when maintenance was last performed on an asset, when the asset was installed, when the asset was prepared, etc.

As shown in FIG. 2C, in some embodiments, maintenance management system 202 can predict (e.g., at (2)(i)), whether a contractor is needed to perform service associated with the trigger, and if so, can (e.g., at (2)(ii)) predict a likely cost associated with the contractor's services. In some embodiments, maintenance management system 202 can predict that a contractor is needed based on the service that is to be performed, and the availability of an employee(s) at the facility with the skills to perform the service. For example, if an employee associated with the facility does not have the skills to perform the service (e.g., based on information stored in corporate database 206), or if an employee with the skills is not available to perform the service, maintenance management system 202 can predict that a contractor is needed to perform the service.

In some embodiments, maintenance management system 202 can predict a likely cost of performing a service associated with the trigger automatically based on information in contractor database 212. For example, maintenance management system 202 can determine a cost associated with the service based on past costs of performing similar services. As another example, maintenance management system 202 can determine a cost associated with the service based on costs associated with one or more service providers 226 performing similar services (e.g., based on past costs, based on a contract, based on previous estimates, etc.).

In some embodiments, maintenance management system 202 can automatically schedule (e.g., at (3)) a service provider (e.g., from among service providers 226 that are capable of performing the service) to perform the service without approval and/or without user intervention (e.g., from a user associated with operator 222, from a user associated with facility 242, from a user associated with property owner 232, from a user associated with the service provider 226, etc.). For example, if the cost of performing the service falls within a pre-approved limit (e.g., a pre-approved limit associated with operator 222, with property owner 232, and/or with facility 242), maintenance management system 202 can automatically schedule the service. In such an example, the pre-approved limit may be a limit associated with a particular type of asset, and/or a particular type of service (e.g., maintenance, repair, etc.).

In some embodiments, maintenance management system 202 can inform (e.g., at (4)) facility 242 (e.g., via a computing device associated with one or more employees and/or residents at facility 242) that service has been scheduled and/or any suitable details regarding the service (e.g., a time or time period when the service can be expected to be performed, identifying information of the service provider, contact information for the service provider, etc.

Figure 2D:
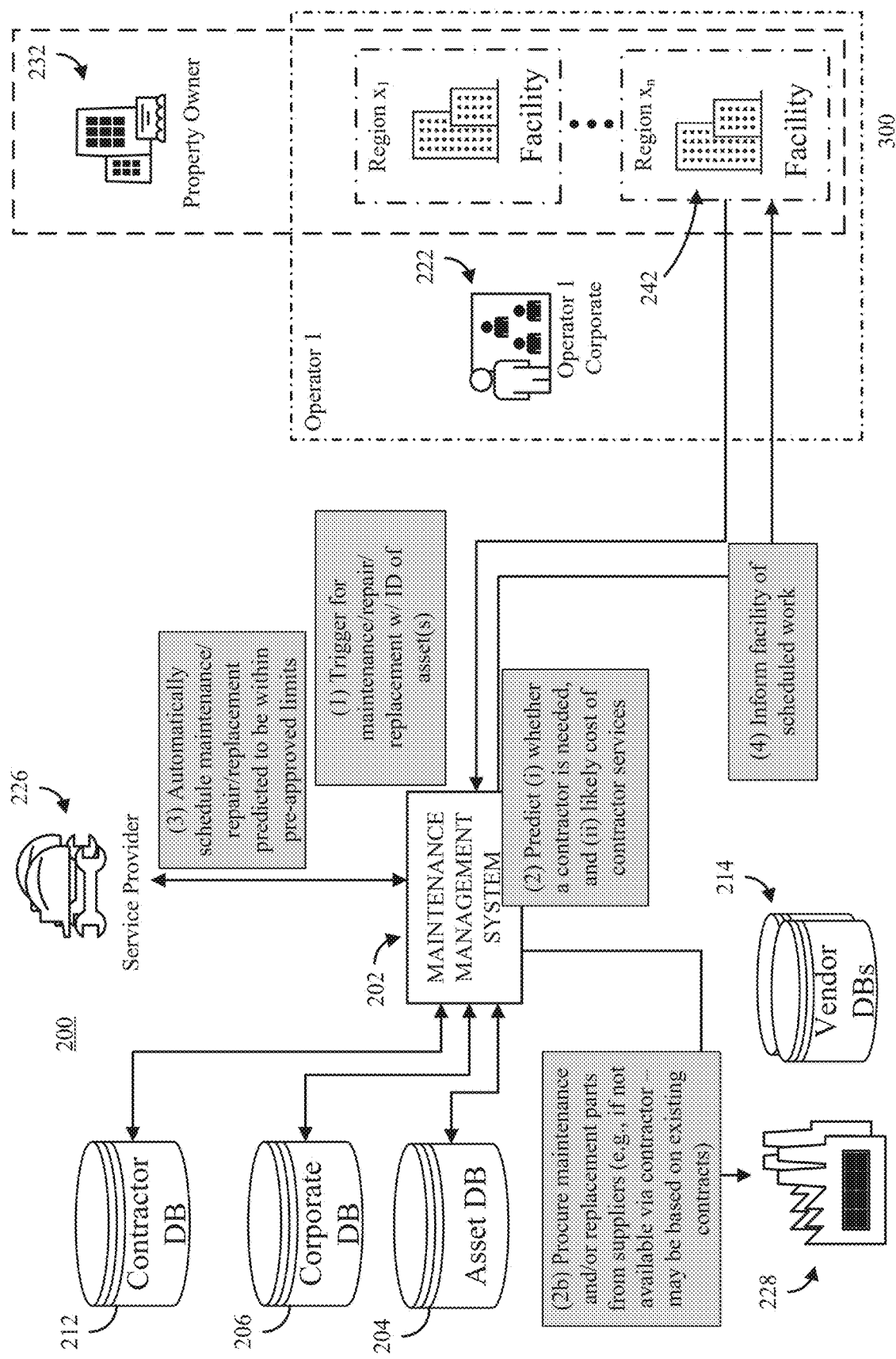
FIG. 2D shows an example of a system for automatically optimizing maintenance automatically scheduling service at a facility by a third party service provider and automatically procuring parts associated with the service in accordance with some embodiments of the disclosed subject matter.

FIG. 2D shows an example of a system for automatically optimizing maintenance automatically scheduling service at a facility by a third party service provider and automatically procuring parts associated with the service in accordance with some embodiments of the disclosed subject matter. As shown in FIG. 2D, in some embodiments, maintenance management system 202 can receive (e.g., at (1)) a communication from facility 242 (e.g., from a computing device associated with facility 242, such as a computing device local to facility 242, or a computing device remote from facility 242) indicating that maintenance, repair, and/or replacement of one or more assets may be needed. In some embodiments, the trigger received at (1) can be associated with information that can be used to identify an asset(s) associated with the trigger (e.g., information indicative of a type of asset, information indicative of a location of the asset, identifying information associated with the asset, etc.).

As shown in FIG. 2D, in some embodiments, maintenance management system 202 can predict (e.g., at (2)(i)), whether a contractor is needed to perform service associated with the trigger, and if so, can (e.g., at (2)(ii)) predict a likely cost associated with the contractors services. In some embodiments, maintenance management system 202 can predict that a contractor is needed based on the service that is to be performed, and the availability of an employee(s) at the facility with the skills to perform the service. For example, if an employee associated with the facility does not have the skills to perform the service (e.g., based on information stored in corporate database 206), or if an employee with the skills is not available to perform the service, maintenance management system 202 can predict that a contractor is needed to perform the service.

In some embodiments, maintenance management system 202 can determine (e.g., at (2b)) that one or more items are needed to perform maintenance and/or to replacement one or more parts associated with the asset. In some embodiments, maintenance management system 202 can use any suitable technique or combination of techniques to determine that one or more items are needed. For example, maintenance management system 202 can determine that one or more items are needed to perform maintenance, repair, and/or replacement of an asset based on information stored in asset database 204. In such an example, maintenance management system 202 can determine which part or parts are associated with similar service (e.g., similar maintenance, repair, and/or replacement), and can determine that the part(s) is likely needed to perform the current service. Additionally or alternatively, maintenance management system 202 can prompt a user of a computing device (e.g., associated with a maintenance employee of facility 242) to provide input indicating which parts may be needed.

In some embodiments, maintenance management system 202 can automatically procure the item(s) for use in performing maintenance (e.g., using a procurement system, such as the procurement system described in U.S. Pat. No. 10,685,308, which has been incorporated herein by reference). For example, maintenance management system 202 can cause the item(s) to be delivered to facility 242 in time to be used in performing service. As another example, maintenance management system 202 can cause the item(s) to be delivered to a service provider performing the service. As still another example, maintenance management system 202 can cause the item(s) to be prepared for pickup at a suitable location by the service provider and/or an employee associated with facility 242. In some embodiments, maintenance management system 202, a procurement system, and/or any other suitable system can procure items based on contracts that operator 222 is a party to, and/or preferences associated with operator 222, that restrict which items can be procured for operator 222 (e.g., limiting items to certain brands, certain levels of quality, certain price levels, certain suppliers, certain manufacturers, certain styles, etc.). Additionally or alternatively, maintenance management system 202, a procurement system, and/or any other suitable system can attempt to procure items based on a contract terms that may not restrict which items operator 222 can procure, but may make it more advantageous (e.g., based on cost, delivery terms, delivery times, etc.) for operator 222 to procure items with certain characteristics. In some embodiments, maintenance management system 202 can send a notification to one or more designated users (e.g., a maintenance employee, a user associated with a selected service provider, etc.) when items have been ordered to indicate that the item has been ordered, an estimated delivery date and/or time, an estimated pickup date and/or time, tracking information, etc. In some embodiments, maintenance management system 202 can determine when a delay is likely (e.g., based on tracking information associated with an order), and can notify a user and/or prompt a user to consider an alternative product that may be available more quickly at a comparable price (or a somewhat higher price if expediting procurement of the item will result in an on-time completion of the unit turn).

In some embodiments, maintenance management system 202 can automatically schedule (e.g., at (3)) a service provider (e.g., from among service providers 226 that are capable of performing the service) to perform the service without approval and/or without user intervention (e.g., from a user associated with operator 222, from a user associated with facility 242, from a user associated with property owner 232, from a user associated with the service provider 226, etc.). For example, if the cost of performing the service falls within a pre-approved limit (e.g., a pre-approved limit associated with operator 222, with property owner 232, and/or with facility 242), maintenance management system 202 can automatically schedule the service. In such an example, the pre-approved limit may be a limit associated with a particular type of asset, and/or a particular type of service (e.g., maintenance, repair, etc.). In some embodiments, maintenance management system 202 may cause a notification to be provided to the service provider indicating that one or more items associated with the service have been procured, and an indication of where, when, how, etc., to obtain the items for use in performing the service.

In some embodiments, maintenance management system 202 can inform (e.g., at (4)) facility 242 (e.g., via a computing device associated with one or more employees and/or residents at facility 242) that service has been scheduled and/or any suitable details regarding the service (e.g., a time or time period when the service can be expected to be performed, identifying information of the service provider, contact information for the service provider, etc.

Figure 2E:
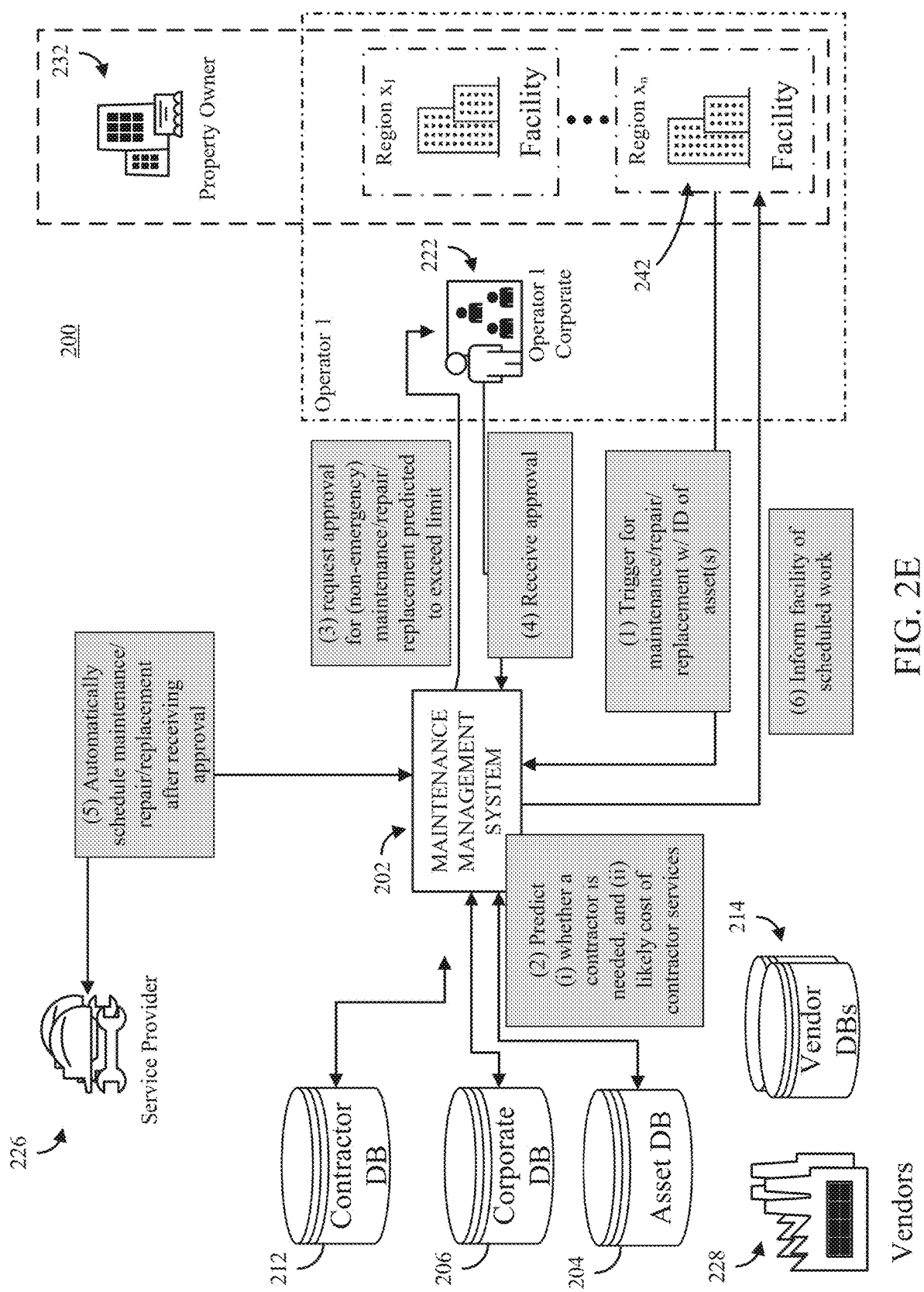
FIG. 2E shows an example of a system for automatically optimizing maintenance automatically prompting an operator to approve a large expenditure and scheduling service at a facility by a third party service provider in accordance with some embodiments of the disclosed subject matter.

FIG. 2E shows an example of a system for automatically optimizing maintenance automatically prompting an operator to approve a large expenditure and scheduling service at a facility by a third party service provider in accordance with some embodiments of the disclosed subject matter. As shown in FIG. 2E, in some embodiments, maintenance management system 202 can receive (e.g., at (1)) a communication from facility 242 (e.g., from a computing device associated with facility 242, such as a computing device local to facility 242, or a computing device remote from facility 242) indicating that maintenance, repair, and/or replacement of one or more assets may be needed. In some embodiments, the trigger received at (1) can be associated with information that can be used to identify an asset(s) associated with the trigger (e.g., information indicative of a type of asset, information indicative of a location of the asset, identifying information associated with the asset, etc.).

As shown in FIG. 2E, in some embodiments, maintenance management system 202 can predict (e.g., at (2)(i)) whether a contractor is needed to perform service associated with the trigger, and if so, can (e.g., at (2)(ii)) predict a likely cost associated with the contractor's services. In some embodiments, maintenance management system 202 can predict that a contractor is needed based on the service that is to be performed, and the availability of an employee(s) at the facility with the skills to perform the service. For example, if an employee associated with the facility does not have the skills to perform the service (e.g., based on information stored in corporate database 206), or if an employee with the skills is not available to perform the service, maintenance management system 202 can predict that a contractor is needed to perform the service.

In some embodiments, maintenance management system 202 can request approval (e.g., at (3)) from a user associated with operator 222 (e.g., a designated user) of a service that exceeds a limit. For example, if the cost of performing the service exceeds a pre-approved limit (e.g., a pre approved limit associated with operator 222, with property owner 232, and/or with facility 242), maintenance management system 202 can request approval from operator 222 (and/or from property owner 232) prior to scheduling the service. In some embodiments, if maintenance management system 202 determines that the service is related to an emergency condition that may affect the health and/or safety of one or more residents and/or employees of facility 202 (e.g., a lack of water, a lack of heat in winter, etc.), maintenance management system 202 can request approval (e.g., at (3)), and can concurrently schedule service, or can schedule service prior to requesting approval. As another example, if the cost of performing the service exceeds a pre-approved limit, if the service is related to an emergency condition, maintenance management system 202 can notify a user associated with operator 222 that the service has been automatically approved.

In some embodiments, maintenance management system 202 can receive approval (e.g., at (4)) from computing device associated with a user associated with operator 222 (e.g., a designated user) of the service. In some embodiments, the approval can be received in any suitable format. Alternatively, if approval is not received (e.g., if approval is denied), maintenance management system 202 can escalate the service request to a user associated with maintenance management system 202, operator 222, and/or property owner 232.

In some embodiments, in response to receiving approval (or in response to notifying operator 222 of an emergency condition), maintenance management system 202 can automatically schedule (e.g., at (5)) a service provider (e.g., from among service providers 226 that are capable of performing the service) to perform the service.

In some embodiments, maintenance management system 202 can inform (e.g., at (6)) facility 242 (e.g., via a computing device associated with one or more employees and/or residents at facility 242) that service has been scheduled and/or any suitable details regarding the service (e.g., a time or time period when the service can be expected to be performed, identifying information of the service provider, contact information for the service provider, etc.

Figure 2F:
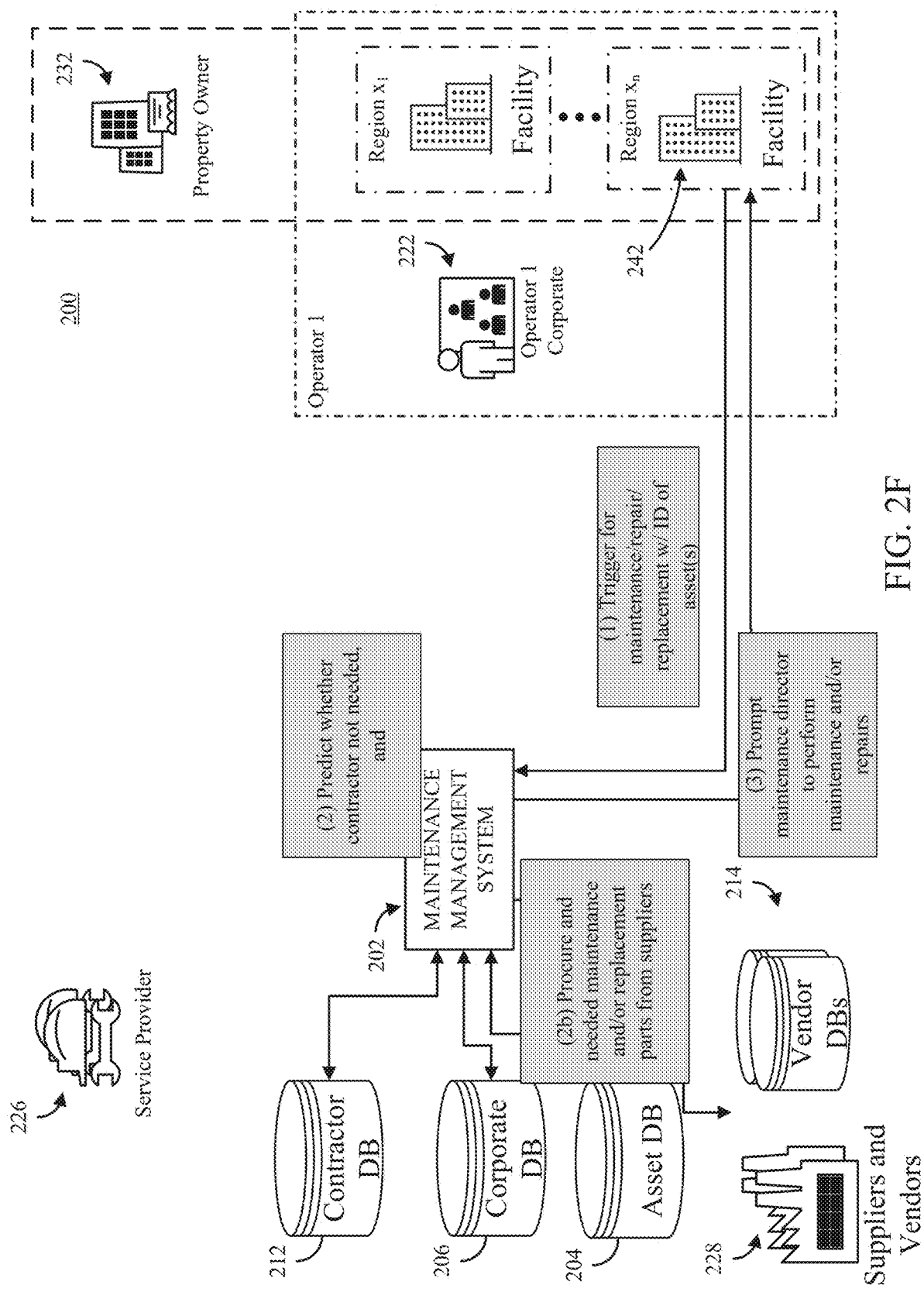
FIG. 2F shows an example of a system for automatically optimizing maintenance automatically prompting an employee of a facility to service an asset and automatically procuring parts associated with the service in accordance with some embodiments of the disclosed subject matter.

FIG. 2F shows an example of a system for automatically optimizing maintenance automatically prompting an employee of a facility to service an asset and automatically procuring parts associated with the service in accordance with some embodiments of the disclosed subject matter. As shown in FIG. 2F, in some embodiments, maintenance management system 202 can receive (e.g., at (1)) a communication from facility 242 (e.g., from a computing device associated with facility 242, such as a computing device local to facility 242, or a computing device remote from facility 242) indicating that maintenance, repair, and/or replacement of one or more assets may be needed. In some embodiments, the trigger received at (1) can be associated with information that can be used to identify an asset(s) associated with the trigger (e.g., information indicative of a type of asset, information indicative of a location of the asset, identifying information associated with the asset, etc.).

As shown in FIG. 2F, in some embodiments, maintenance management system 202 can predict (e.g., at (2)), that a contractor is not needed to perform service associated with the trigger. In some embodiments, maintenance management system 202 can predict that a contractor is not needed based on the service that is to be performed, and the availability of an employee(s) at the facility with the skills to perform the service. For example, if an employee associated with the facility does have the skills to perform the service (e.g., based on information stored in corporate database 206), and if an employee with the skills is not available to perform the service, maintenance management system 202 can predict that a contractor is not needed to perform the service.

In some embodiments, maintenance management system 202 can determine (e.g., at (2b)) that one or more items are needed to perform maintenance and/or to replacement one or more parts associated with the asset. In some embodiments, maintenance management system 202 can use any suitable technique or combination of techniques to determine that one or more items are needed. For example, maintenance management system 202 can determine that one or more items are needed to perform maintenance, repair, and/or replacement of an asset based on information stored in asset database 204. In such an example, maintenance management system 202 can determine which part or parts are associated with similar service (e.g., similar maintenance, repair, and/or replacement), and can determine that the part(s) is likely needed to perform the current service. Additionally or alternatively, maintenance management system 202 can prompt a user of a computing device (e.g., associated with a maintenance employee of facility 242) to provide input indicating which parts may be needed.

In some embodiments, maintenance management system 202 can automatically procure the item(s) for use in performing maintenance (e.g., using a procurement system, such as the procurement system described in U.S. Pat. No. 10,685,308, which has been incorporated herein by reference). For example, maintenance management system 202 can cause the item(s) to be delivered to facility 242. As another example, maintenance management system 202 can cause the item(s) to be prepared for pickup at a suitable location (e.g., by an employee associated with facility 242). In some embodiments, maintenance management system 202, a procurement system, and/or any other suitable system can procure items based on contracts that operator 222 is a party to, and/or preferences associated with operator 222, that restrict which items can be procured for operator 222 (e.g., limiting items to certain brands, certain levels of quality, certain price levels, certain suppliers, certain manufacturers, certain styles, etc.). Additionally or alternatively, maintenance management system 202, a procurement system, and/or any other suitable system can attempt to procure items based on a contract terms that may not restrict which items operator 222 can procure, but may make it more advantageous (e.g., based on cost, delivery terms, delivery times, etc.) for operator 222 to procure items with certain characteristics.

In some embodiments, maintenance management system 202 can automatically prompt (e.g., at (3)) a maintenance employee associated with facility 242 to perform the service without approval and/or without user intervention (e.g., from a user associated with operator 222, from a user associated with facility 242, from a user associated with property owner 232, from a user associated with the service provider 226, etc.). For example, if the cost of performing the service falls within a pre-approved limit (e.g., a pre-approved limit associated with operator 222, with property owner 232, and/or with facility 242), maintenance management system 202 can automatically prompt the employee to perform the service.

Figure 3:
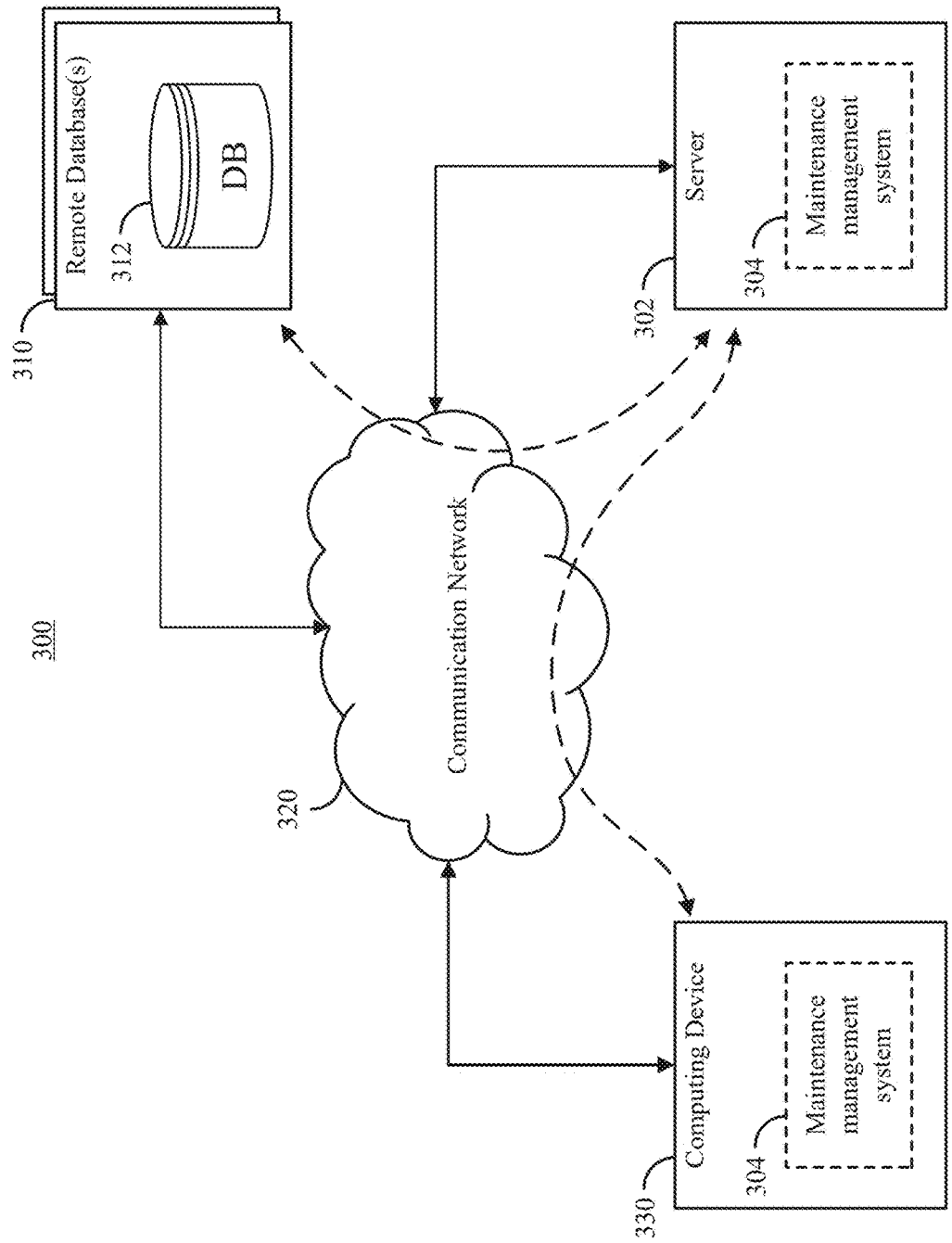
FIG. 3 shows an example of a system for automatically optimizing maintenance in accordance with some embodiments of the disclosed subject matter.

FIG. 3 shows an example 300 of a system for automatically optimizing maintenance in accordance with some embodiments of the disclosed subject matter. As shown in FIG. 3, a server (or other processing unit) 302 can execute one or more applications to provide access to a maintenance management system 304. In some embodiments, maintenance management system 304 can facilitate automatic optimization of maintenance, creation of one or more templates for generating customized user interface for optimizing maintenance associated with a unit turn, for prompting a user to complete one or more tasks associated with a unit turn, for notifying one or more users of a status of a unit turn, etc.

In some embodiments, maintenance management system 304 can assist an organization in the management of maintenance in one or more of its facilities. For example, maintenance management system 304 can be used in connection with a mobile computing device that can be used to capture images of assets (e.g., indicative of a condition of the asset), provide input to a customized user interface, prompt a user to capture an image of an asset, prompt a user to provide input documenting condition of an asset, notify a user with an update about a status of an asset, notify a user with an update about a status of a unit, to request approval of certain tasks, etc.

In some embodiments, server 302, and/or maintenance management system 304 can receive a request to create a unit turn (e.g., information triggering creation of a unit turn), receive one or more images of an asset, receive input (e.g., user input), and/or any other suitable data, over a communication network 320. In some embodiments, such information can be received from any suitable computing device, such as computing device 330. For example, computing device 330 can receive user input through an application being executed by computing device 330, such as through an input device (e.g., a keyboard, mouse, microphone, touchscreen, and the like). In such an example, computing device 330 can communicate information over communication network 320 to server 302 (or another server that can provide the information to server 302). As shown in FIG. 3, maintenance management system 304 can be implemented using computing device 330 and/or server 302. For example, server 302 can be used to implement at least a portion of a back-end of maintenance management system 304 and computing device 330 can be used to implement at least a portion of a front-end of maintenance management system 304.

In some embodiments, server 302 can communicate with one or more computing devices, such as a one or more database servers 310, to collect information about facilities, assets, service providers, distributors, product availability, and/or any other suitable information. In some embodiments, database server 310 (e.g., customer DB 208) can be used (e.g., by an operator and/or regional facility) to manage information about residents of a facility. For example, database server 310 can be used to manage a database 312 that includes information about residents of one or more particular facilities.

In some embodiments, server 302 can communicate with one or more distributor database servers 310 to collect information that can be used to automatically optimize maintenance at one or more facilities. In some embodiments, server 302 can collect information about various assets into a single database (e.g., asset database 204 described above in connection with FIG. 2A). In some embodiments, computing device 330 can communicate with server 302 to retrieve information about a particular asset or type of asset. For example, computing device 330 can be used to present a user interface that can be used to initiate a request to server 302 related to one or more assets associated with a particular unit in a facility, such as a date when a particular asset was installed, a date when a particular asset was last repaired, information about a repair that was made, and any other suitable information.

In some embodiments, communication network 320 can be any suitable communication network or combination of communication networks. For example, communication network 320 can include a Wi-Fi network (which can include one or more wireless routers, one or more switches, and the like), a peer-to-peer network (e.g., a Bluetooth network), a cellular network (e.g., a 3G network, a 4G network, a 5G network, etc., complying with any suitable standard(s), such as CDMA, GSM, LTE, LTE Advanced, WiMAX, 5G NR, etc.), a wired network, etc. In some embodiments, communication network 320 can be a local area network (LAN), a wide area network (WAN), a public network (e.g., the Internet, which may be part of a WAN and/or LAN), a private or semi-private network (e.g., a corporate or university intranet), any other suitable type of network, or any suitable combination of networks. Communications links shown in FIG. 3 can each be any suitable communications link or combination of communications links, such as wired links, fiber optic links, Wi-Fi links, Bluetooth links, cellular links, and the like. In some embodiments, server 302 and/or computing device 330 can be any suitable computing device or combination of devices, such as a desktop computer, a laptop computer, a smartphone, a tablet computer, a wearable computer, a server computer, a virtual machine being executed by a physical computing device, one or more containers executed by a computing device (e.g., a virtual machine, a physical computing device, etc.), etc.

In some embodiments, communications transmitted over communication network 320 and/or communication links shown in FIG. 3 can be secured using any suitable technique or combination of techniques. For example, in some embodiments, communications transmitted to and/or from server 302, computing device 330, and/or database server 310 can be encrypted using any suitable technique or combination of techniques. For example, communication between two or more computing devices associated with communication network 320 (e.g., server 302, computing device 330, database server 310, Domain Name System (DNS) servers, one or more intermediate nodes that serve as links between two or more other devices, such as switches, bridges, routers, modems, wireless access points, and the like) computing devices can be carried out based on Hypertext Transfer Protocol Secure (HTTPS). As another example, communications can be carried out based on Transport Layer Security (TLS) protocols and/or Secure Sockets Layer (SSL) protocols. As yet another example, communications can be carried out based on Internet Protocol Security (IPsec) protocols. As still another example, a virtual private network (VPN) connection can be established between one or more computing devices associated with computing network 320. In some embodiments, one or more techniques can be used to limit access to communication network 320 and/or a portion of communication network 320. For example, computing devices attempting to connect to the network and/or transmit communications using the network can be required to provide credentials (e.g., a username, a password, a hardware-based security token, a software-based security token, a one-time code, any other suitable credentials, or any suitable combination of credentials).

In some embodiments, one or more security techniques can be applied to any suitable portion of a communication network that interacts with computing devices. For example, security techniques can be used to implement a secure Wi-Fi network (which can include one or more wireless routers, one or more switches, and the like), a secure peer-to-peer network (e.g., a Bluetooth network), a secure cellular network (e.g., a 3G network, a 4G network, a 5G network, and the like, complying with any suitable standard(s), such as CDMA, GSM, LTE, LTE Advanced, WiMAX, 5G NR, and the like), and the like.

Figure 4:
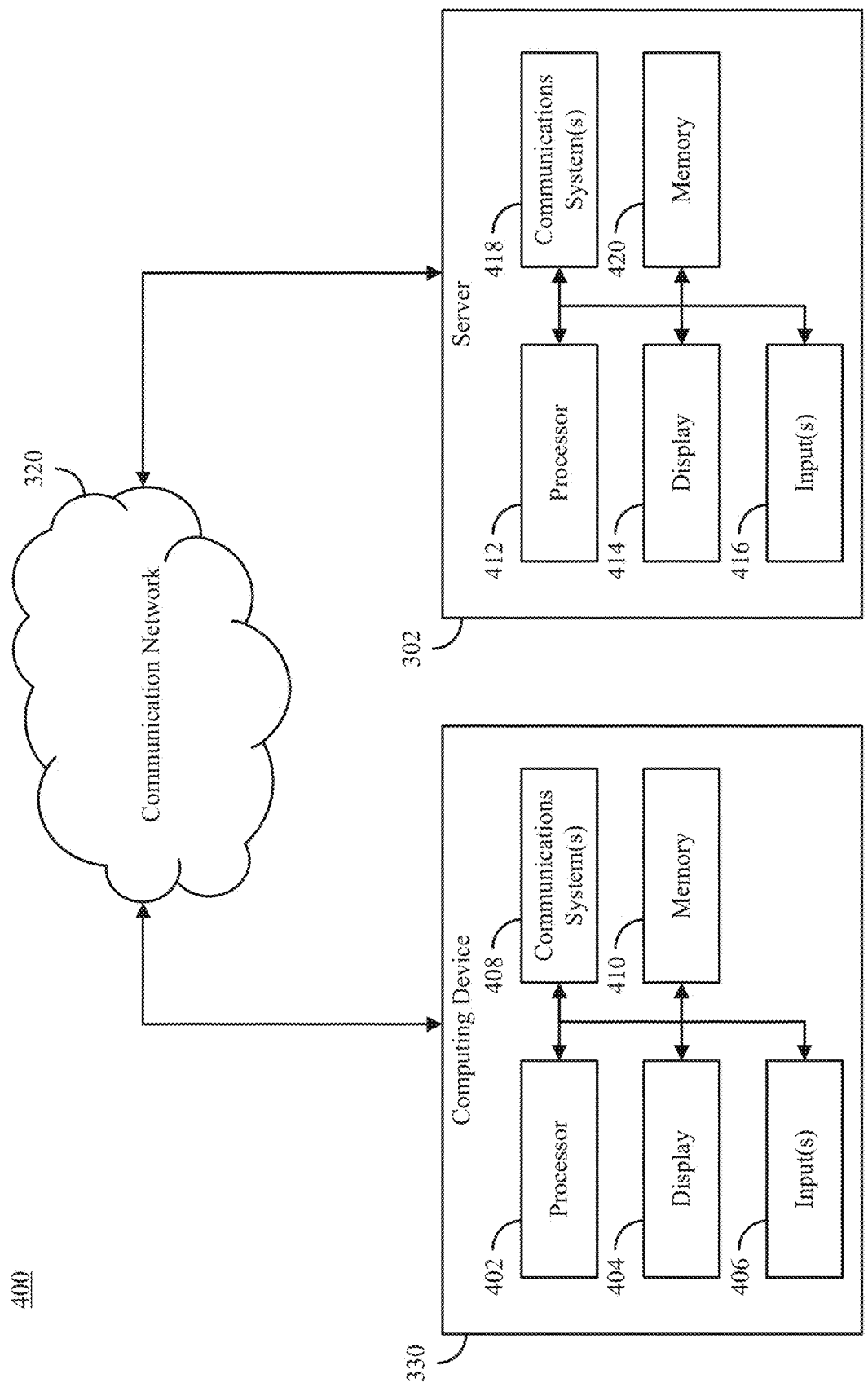
FIG. 4 shows an example of hardware that can be used to implement server and computing device in accordance with some embodiments of the disclosed subject matter.

FIG. 4 shows an example 400 of hardware that can be used to implement server 302 and computing device 330 in accordance with some embodiments of the disclosed subject matter. As shown in FIG. 4, in some embodiments, computing device 330 can include a processor 402, a display 404, one or more inputs 406, one or more communication systems 408, and/or memory 410. In some embodiments, processor 402 can be any suitable hardware processor or combination of processors, such as a central processing unit (CPU), a graphics processing unit (GPU), etc. In some embodiments, display 404 can include any suitable display devices, such as a computer monitor, a touchscreen, a television, and the like. In some embodiments, inputs 406 can include any suitable input devices and/or sensors that can be used to receive user input, such as a keyboard, a mouse, a touchscreen, a microphone, a camera, etc.

In some embodiments, communications systems 408 can include any suitable hardware, firmware, and/or software for communicating information over communication network 320 and/or any other suitable communication networks. For example, communications systems 408 can include one or more transceivers, one or more communication chips and/or chip sets, and the like. In a more particular example, communications systems 408 can include hardware, firmware and/or software that can be used to establish a Wi-Fi connection, a Bluetooth connection, a cellular connection, an Ethernet connection, and the like.

In some embodiments, memory 410 can include any suitable storage device or devices that can be used to store instructions, values, and the like, that can be used, for example, by processor 402 to present content using display 404, to communicate with server 302 via communications system(s) 408, etc. Memory 410 can include any suitable volatile memory, non-volatile memory, storage, or any suitable combination thereof. For example, memory 410 can include RAM, ROM, EEPROM, one or more flash drives, one or more hard disks, one or more solid state drives, one or more optical drives, and the like. In some embodiments, memory 410 can have encoded thereon a computer program for controlling operation of computing device 330. In such embodiments, processor 502 can execute at least a portion of the computer program to present content (e.g., user interfaces, tables, graphics, and the like), receive content from server 302, transmit information to server 302, etc.

In some embodiments, server 302 can be implemented using one or more servers 302 (e.g., functions described as being performed by server 302 can be performed by multiple servers acting in concert) that can include a processor 412, a display 414, one or more inputs 416, one or more communications systems 418, and/or memory 420. In some embodiments, processor 412 can be any suitable hardware processor or combination of processors, such as a CPU, a GPU, etc. In some embodiments, display 414 can include any suitable display devices, such as a computer monitor, a touchscreen, a television, etc. In some embodiments, inputs 416 can include any suitable input devices and/or sensors that can be used to receive user input, such as a keyboard, a mouse, a touchscreen, a microphone, and the like. In some embodiments, server 302 can be a mobile device.

In some embodiments, communications systems 418 can include any suitable hardware, firmware, and/or software for communicating information over communication network 320 and/or any other suitable communication networks. For example, communications systems 418 can include one or more transceivers, one or more communication chips and/or chip sets, etc. In a more particular example, communications systems 418 can include hardware, firmware and/or software that can be used to establish a Wi-Fi connection, a Bluetooth connection, a cellular connection, an Ethernet connection, etc.

In some embodiments, memory 420 can include any suitable storage device or devices that can be used to store instructions, values, and the like, that can be used, for example, by processor 412 to present content using display 414, to communicate with one or more computing devices 330, etc. Memory 420 can include any suitable volatile memory, non-volatile memory, storage, or any suitable combination thereof. For example, memory 420 can include RAM, ROM, EEPROM, one or more flash drives, one or more hard disks, one or more solid state drives, one or more optical drives, and the like. In some embodiments, memory 420 can have encoded thereon a server program for controlling operation of server 302. In such embodiments, processor 412 can execute at least a portion of the server program to transmit information and/or content (e.g., results of a database query, a portion of a user interface, textual information, graphics, etc.) to one or more computing 330, receive information and/or content from one or more computing devices 330, receive instructions from one or more devices (e.g., a personal computer, a laptop computer, a tablet computer, a smartphone, etc.), etc.

Figure 5:
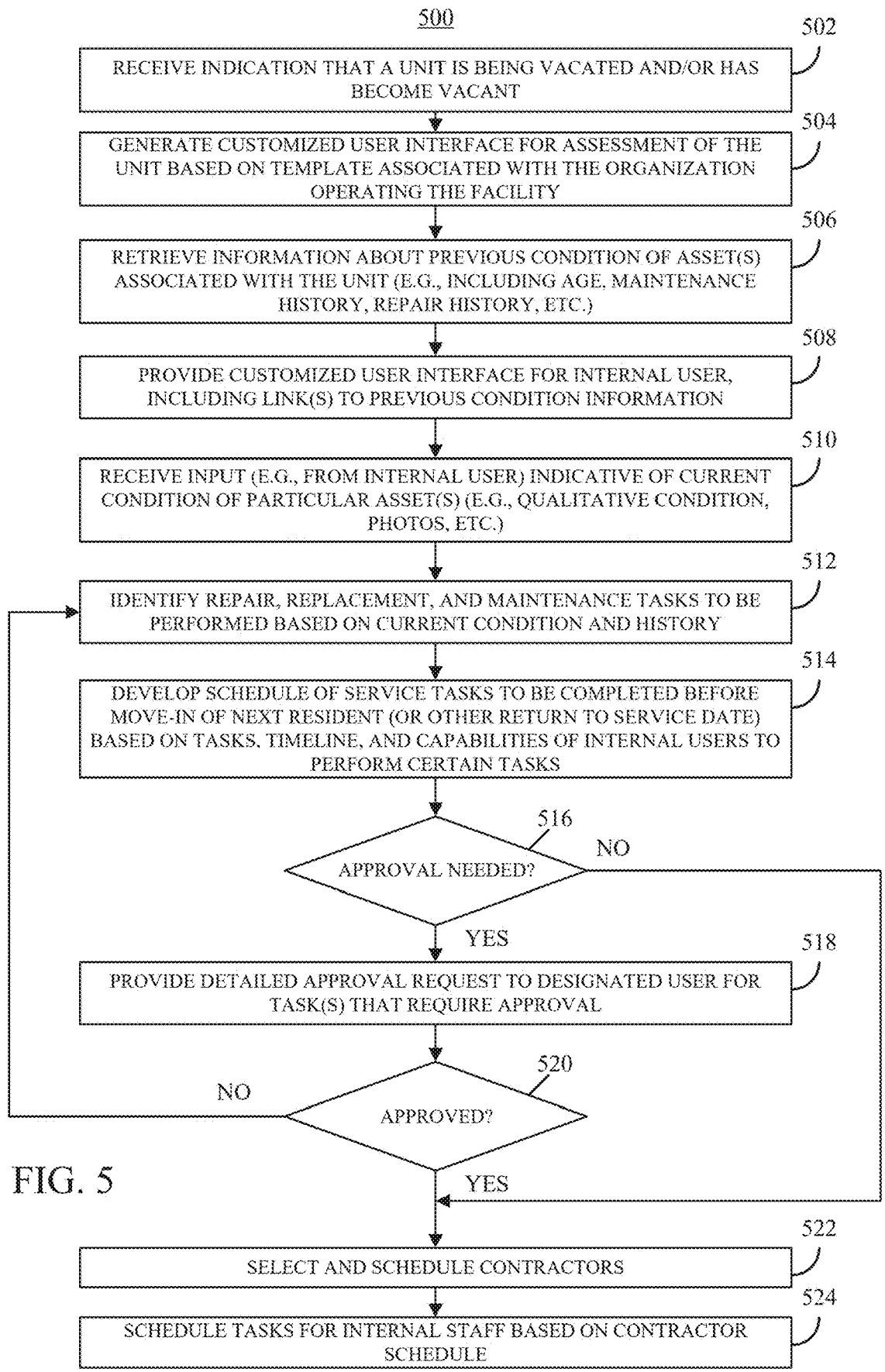
FIG. 5 shows an example of a process for automatically optimizing maintenance associated with a unit turn in accordance with some embodiments of the disclosed subject matter.

FIG. 5 shows an example of a process for automatically optimizing maintenance associated with a unit turn in accordance with some embodiments of the disclosed subject matter. In some embodiments, at 502, process 500 can receive an indication that a unit is being vacated (e.g., by a particular date) and/or has become vacated (e.g., as of at least a particular date). In some embodiments, process 500 can receive the indication that the unit is being vacated and/or has become vacant from any suitable source and/or using any suitable technique or combination of techniques. For example, process 500 can receive the indication from a computing device associated with an operator of one or more facilities (e.g., operator 222). In a more particular example, the indication can be provided via input to a user interface (e.g., a web page, a locally installed application, etc.) associated with a maintenance management system (e.g., maintenance management system 202, maintenance management system 304). In such an example, a web page can be provided via a web server associated with the maintenance management system, and an application associated with the maintenance management system can be installed via any suitable source (e.g., the APPLE app store, the GOOGLE PLAY store, etc.).

As another more particular example, the indication can be provided via a computing device used to manage an inventory of units (e.g., a computing device used to access customer database 208) associated with in one or more facilities (e.g., via an application program interface (API)). As yet another more particular example, the indication can be provided via a computing device used to record and/or access information about residents (e.g., a computing device used to access resident database 210, a computing device use to access an electronic health records system, which may be included in and/or accessed by resident database 210). In such an example, additional information regarding a most recent resident can be received from the electronic health record database and/or resident database, which can include information that may be relevant to a unit turn (e.g., length of occupancy, actual time spent in the unit which may be based on time spent hospitalized, an indication of whether the resident used a wheelchair, an indication of whether the resident used a motorized wheelchair or other motorized mobility device).

At 504, process 500 can generate a customized user interface for prompting an assessment of the unit based on a template associated with the organization operating the facility. In some embodiments, process 500 can use any suitable technique or combination of techniques to generate a customized user interface. For example, process 500 can assemble a set of instructions (e.g., a set of instructions formatted in a JavaScript Object Notation (JSON) file, formatted in an XML file, formatted in an HTML file, etc.) that cause a computing device (e.g., computing device 330) to present the customized user interface.

In some embodiments, process 500 can cause the customized user interface to include one or more selectable user interface elements associated with each of various assets. For example, process 500 can cause the user interface to include a first selectable user interface element associated with an asset (e.g., a type of asset) that facilitates indicating a condition of the asset. In such an example, selecting the first selectable user interface element can cause a set of one or more selectable condition user interface elements to be presented, selection of which can cause an indication of a condition of an asset to be recorded.

As another example, process 500 can cause the user interface to include a second selectable user interface element associated with an asset (e.g., a type of asset) that causes instructions associated with assessment of the asset to be presented. In such an example, selecting the second selectable user interface element can cause instructions (e.g., text) to be presented to assist a user in assessing the condition of the asset (e.g., as described below in connection with FIG. 9A.

As yet another example, process 500 can cause the user interface to include a third selectable user interface element associated with an asset (e.g., a type of asset) that facilitates entry of additional information, such as notes, an image, etc. In such an example, selecting the third selectable user interface element can cause a user interface element that allows entry and/or recording of information (e.g., text data, audio data, image data, video data, etc.) that can be used to provide additional context (e.g., to an assessment of condition, to indicate which repairs need to be completed, to specify a portion of an asset that needs attention, such as repair or replacement, etc.).

At 506, process 500 can retrieve information about a previous condition of one or more assets associated with the unit, such as an age of the asset (e.g., indicating when the asset was installed), a maintenance history of the asset (e.g., if and/or when maintenance was last performed, one or more times when maintenance was performed prior to a most recent maintenance, etc.), a repair history of the asset (e.g., if and/or when at least a portion of the asset was last repaired, what the most recent repair included, if and/or when the asset was repaired prior to a most recent repair, what the previous repairs included, etc.), one or more previous condition assessments, information associated with one or more previous condition assessments (e.g., notes, images, etc.). In some embodiments, the information about a previous condition can include a quantitative metric indicative of the previous condition of one or more assets associated with the unit. The quantitative metric can represent the condition on a numerical scale (e.g., a scale from 0-100, 1-100, 0-50, 1-50, 0-10, 1-10, 0-5, 1-5, etc.), which can be formatted in any suitable manner (e.g., with lower numerical values indicating better condition, such as a representation of how much of the assets value or useful life has been utilized, or with lower numerical values indicating worse condition). In some embodiments, any suitable technique or combination of techniques can be used to determine the quantitative metric. For example, a machine learning model can be trained to determine a quantitative metric indicative of the condition of an asset based on one or more inputs. Inputs can include, for example, an age of the asset, a maintenance history of the asset, a repair history of the asset, one or more previous condition assessments, information associated with one or more previous condition assessments, one or more images of the asset, other textual information (e.g., notes regarding a status of the asset). In a more particular example, one or more machine vision techniques can be used to determine a quantitative metric indicative of the condition of the asset (e.g., the previous condition at a point in time at which the image(s) was capture). As another more particular example, one or more natural language processing techniques can be used to determine the quantitative metric of the condition of the asset (e.g., the previous condition at a point in time at which the image(s) was capture) based on inputted textual notes. In some embodiments, process 500 can retrieve the information about a previous condition of the one or more assets from an asset database (e.g., asset database 204) using any suitable information to query the asset database, such as identifying information associated with the unit.

In some embodiments, process 500 can associate the asset history information with one or more portions of the customized user interface generated at 504. For example, process 500 can include instructions that cause a portion of the customized user interface to present at least a portion of the asset history information. As a more particular example, process 500 can cause a portion of the asset history information (e.g., a previous condition assessment at a last unit turn, a time of most recent maintenance, a time of most recent repair, a current lifetime of the asset, any other suitable information, and/or any suitable combination of information) to be presented in connection with a set of one or more selectable condition user interface elements, selection of which can cause an indication of a condition of an asset to be recorded. As another more particular example, process 500 can cause a selectable user interface element to be included, selection of which causes detailed asset history information to be presented (e.g., additional detail). In such an example, the selectable user interface element can be formatted as a hyperlink (or any other suitable type of user interface element), which may cause the computing device presenting the customized user interface to request the asset history information (e.g., from a maintenance management system, from an asset history database, etc.). Alternatively, the selectable user interface element can be formatted as any suitable type of user interface element (e.g., hyperlink, a button, etc.), and selection of the user interface element can cause the computing device presenting the customized user interface element to present asset history information that has previously been provided to the computing device presenting the customized user interface element (e.g., provided with instructions for presenting the customized user interface).

At 508, process 500 can provide the customized user interface for an internal user (e.g., a user associated with a facility, such as a maintenance employee, a marketing employee, a sales employee, a site manager, a maintenance director, etc.), including links to previous condition information (e.g., links to another source of information, such as an asset database, and/or links to information provided with the customized user interface). For example, process 500 can provide instructions to a computing device that causes the computing device to present the customized user interface. In such an example, process 500 can provide the customized user interface in response to a request for the customized user interface (e.g., selection of a user interface element corresponding to a unit associated with the customized user interface).

In some embodiments, process 500 can provide the customized user interface via a set of instructions that cause an application (e.g., a web browser, a locally installed application) executed by a computing device associated with the internal user (e.g., a computing device that the internal user used to log in to a maintenance management service associated with a maintenance management system) to present the customized user interface.

At 510, process 500 can prompt the internal user to provide input indicative of a current condition of assets associated with the unit, and can receive input indicative of a current condition of particular assets (e.g., specified by the template used to generate the customized user interface). In some embodiments, process 500 can prompt a user to provide input using any suitable technique or combination of techniques. For example, process 500 can cause a computing device associated with the internal user to present the customized user interface element, which can prompt the internal user to assess the current condition of one or more assets. As another example, process 500 can cause a computing device associated with the internal user to present a notification (e.g., a push notification) prompting the user to perform the assessment. As yet another example, process 500 can send a message to the internal user (e.g., a short message service (SMS) message, an email, etc.) prompting the internal user to perform the assessment.

As still another example, a device presenting the customized user interface (e.g., computing device 330) can execute at least a portion of process 500, and can prompt a user to perform an assessment (e.g., via a notification presented on a lock screen or a home screen of the computing device, via instructions provided in the customized user interface etc.).

In some embodiments, process 500 can receive input (e.g., via a computing device presenting a customized user interface) indicative of a current condition of one or more assets in any suitable format. For example, process 500 can receive a qualitative indication of a condition of an asset (e.g., good, needs repair, needs replacement, not applicable, fair, poor, etc.). In such an example, such a qualitative indication of a condition of an asset can be provided via a selectable user interface element (e.g., each associated with a particular condition, as shown in FIG. 9J). As another example, process 500 can receive one or more images of an asset. For example, if the condition is indicated as replace, process 500 (e.g., via the customized user interface element) may prompt a user to capture an image (e.g., using a camera of a computing device presenting the customized user interface) of the asset showing damage, wear, etc., indicating that the asset should be replaced. As yet another example, process 500 can receive text, audio, etc., including details that may be useful in further assessing a condition of the asset, and/or determining whether to repair or replace the asset.

In some embodiments, process 500 can generate a quantitative metric indicative of a current condition of each of one or more particular assets associated with the unit. As described above in connection with 506, the quantitative metric can represent the condition of an asset on a numerical scale, which can be formatted in any suitable manner. In some embodiments, any suitable technique or combination of techniques can be used to determine the quantitative metric. For example, a machine learning model can be trained to determine the quantitative metric indicative of the condition of an asset based on one or more inputs. Inputs can include, for example, an age of the asset, a maintenance history of the asset, a repair history of the asset, one or more previous condition assessments, information associated with one or more previous condition assessments, one or more images of the asset, other textual information (e.g., notes regarding a status of the asset). In a more particular example, one or more machine vision techniques can be used to determine a quantitative metric indicative of the condition of the asset (e.g., holes in, or other damage to, a carpet can be identified). As another more particular example, one or more natural language processing techniques can be used to determine the quantitative metric of the condition of the asset based on inputted textual notes (e.g., "damage to carpet"). In some embodiments, a previous condition of an asset (e.g., images associated with the asset at a previous point in time, notes associated with the asset at a previous point in time) can be used to determine a quantitative metric indicative of a current condition of the asset (e.g., based on differences between the input associated with the previous condition and current input associated with the current condition).

At 512, process 500 can identify tasks to be performed to place the unit in condition for occupancy based on the current condition of the assets and a history associated with the asset (and/or any other suitable information, such as information about a previous resident or residents that may impact whether repair or replacement is more likely to be needed for a particular asset). For example, process 500 can identify repair tasks, maintenance tasks, replacement tasks, etc., that can be performed to bring the condition of assets into a suitable condition.

In some embodiments, process 500 can identify replacement tasks that may be required to replace assets that are damaged or worn, and have reached an end of a useful life of the asset. For example, process 500 can identify any assets that a user indicated need to be replaced as potential replacement tasks. As another example, process 500 can identify any assets that have reached an end of a useful life of the asset as potential replacement tasks based on when the asset was installed, last repaired, etc. (e.g., regardless of whether the subjective condition provided by a user indicates that replacement is needed).

In some embodiments, process 500 can identify repair tasks that may be required to repair assets that are damaged or worn, but have reached an end of a useful life of the asset. For example, process 500 can identify any assets that a user indicated need to be repaired as potential replacement tasks.

In some embodiments, process 500 can determine whether to identify repair tasks or replacement tasks based on scheduling and prioritization. For example, it may be faster to perform repair tasks over replacement tasks when quicker turnover of a unit is desirable. Process 500 can determine whether a relatively quick turnaround is desirable based on information about the unit(s), such as move in and/or move out dates, attributes of the unit(s), or any suitable information about demand for units, such as occupancy of similar units, time to occupancy for similar units, etc. In some embodiments, process 500 can prioritize identification of repair and/or replacement tasks based on a target completion date and average time to complete a particular repair and/or replacement task.

In some embodiments, process 500 can identify maintenance tasks that may be required to maintain one or more assets (e.g., assets that can benefit from maintenance, and which are not indicated as needing replacement). For example, process 500 can identify any assets that may need maintenance based on a maintenance history of an asset, and information indicative of maintenance intervals. In such an example, certain maintenance tasks that are called for within a particular period of time (e.g., within 1 year, within 6 months, etc.) can be identified as a potential maintenance task to be performed during the turnover of the unit, as some maintenance tasks may be disruptive to a resident if performed when the unit is occupied. Note that maintenance tasks can include upkeep to prolong the need to replace an asset. Additionally, not performing maintenance tasks can detract from the useful life of an asset.

At 514, process 500 can develop a schedule of service tasks to be completed before a move-in of a next resident (or other return to service date) based on tasks identified at 514, a timeline of when the unit is scheduled to be placed back into service, capabilities of internal users (e.g., maintenance employees associated with a facility in which the unit is located), and/or any other suitable information.

For example, process 500 can estimate how long each task may take to accomplish, whether each task can be performed by an internal user (e.g., a maintenance employee), whether a task may require an outside contractor, when an outside contractor can be scheduled to perform a task, etc., and schedule tasks to be performed to place the unit back into service within a scheduled time period. In some embodiments, process 500 can account for other tasks that an internal user may be scheduled to perform (e.g., tasks associated with another unit turn, routine maintenance on assets in occupied units, repair of assets in occupied units, etc.).

At 516, process 500 can determine whether any manual approvals (which can also be referred to as authorizations) are needed for tasks identified at 512 and/or scheduled at 514. For example, process 500 can determine whether any tasks are associated with a cost (e.g., including one or more of labor cost, equipment cost, supply cost, etc.) that exceeds a limit. In such an example, if the cost associated with the task is associated with a cost that exceeds the limit, process 500 can determine that the task requires manual approval (e.g., by a designated user, by a user associated with a role that is permitted to authorize such a task, etc.). As another example, process 500 can determine whether any replacement tasks are identified for an asset that has not reached a threshold age (e.g., a minimum age for replacement). In such an example, if an asset designed for replacement has not reached a threshold age, process 500 can determine that the replacement requires manual approval. As yet another example, process 500 can predict which assets may need to be replaced based on asset history information, resident information, etc., and process 500 can determine whether any replacement tasks are associated with assets that process 500 predicted as not needing replacement. In such an example, process 500 can estimate a current condition of an asset based on a prior condition(s) of the asset, a time that has elapsed since the prior condition(s) of the asset were documented, information associated with a most recent resident of the unit (e.g., a length of occupancy, actual time spent in the unit which may be at least partially based on data indicating time the most recent resident spent hospitalized, whether the resident used a wheelchair, whether the resident used a motorized wheelchair or other motorized mobility device), a number of service events associated with the asset (e.g., a number of times a carpet was cleaned, which may be indicative of extra wear on the carpet, a number of times an applicant was repaired, etc.), whether maintenance tasks were performed on an asset on schedule (e.g., replacing filters in an HVAC unit), information about an average useful life of the first asset in units similar to the unit, any other suitable information that may be indicative of a change in condition, and/or any suitable combination thereof (e.g., an image of an asset or textual notes on a condition of an asset). Note that information associated with the unit, such as information associated with a most recent resident of the unit, can be received from any suitable source, such as an electronic medical record database, a resident database, etc. In such an example, if process 500 predicts that a condition of an asset associated with a replacement task does not indicate that the asset needs to be replaced, process 500 can determine that the replacement requires manual approval.

In some embodiments, process 500 can utilize a quantitative estimate of a current condition of an asset, such as a quantitative metric indicative of a current condition of the asset (e.g., as described above in connection with 506 and 510) to determine whether a manual approval is needed to perform a task associated with the asset (e.g., replacement of the asset, repair of the asset, etc.). For example, the quantitative metric can be compared to a threshold at which replacement does not require manual approval. As another For example, the quantitative metric can be compared to a threshold at which repair requires manual approval (e.g., as costs associated with repairing the asset may cause total expected costs to rise based on a relatively poor overall condition of the assets).

In some embodiments, process 500 can automatically approve certain tasks (e.g., tasks that are not identified as needing manual approval). Alternatively, in some embodiments, any tasks that do not need manual approval can be performed without any approval. In some embodiments, process 500 can automatically approve tasks (e.g., repairs, replacements, etc.) based on various factors (e.g., estimated and/or indicated condition and automatic approval configurations that are set by an organization for a facility). For example, process 500 can automatically approve a task if an associated cost (e.g., estimated cost) is below a limit, and can otherwise require manual approval by a designated user if the cost is above the limit. In some embodiments, there can be multiple limits associated with different levels of approval, and each can be associated with a different designated user and/or a user in a different role. For example, limits can be a configuration set by an organization associated with a facility in which the unit is located. As another example, process 500 can automatically approve a task based on if a user associated with a facility is capable of performing the task, and can require manual approval if the task requires an outside contractor. As another example, process 500 can automatically approve a task if it is a repair task, and can require manual approval if it is a replacement task that satisfies one or more criteria (e.g., the cost is over a limit). As yet another example, process 500 can automatically approve a task if the task does not require purchasing any additional items (e.g., component, replacement equipment, supplies, etc.), such as a simple repair and/or if any items required for the task are determined to be on hand (e.g., by checking an asset database, indication by a user that the item is on hand). In such an example, if a task requires purchasing an item required to perform the task and/or purchasing an item with a cost above a configured limit, process 500 can require manual approval.

As still another example, process 500 can automatically approve a task, such as a replacement task, if an age of an asset has exceeded a threshold age (e.g., a useful life for an asset or asset type), and can require manual approval if the asset has not exceeded a threshold age. A threshold hold age can be a baseline useful life value for an asset, or it may be dynamically calculated from a baseline useful life value adjusted based on additional information relating to the asset, such as history of the asset (e.g., previous condition). In a particular example, not performing scheduled maintenance tasks for an asset can negatively impact the threshold age (e.g., leading to an adjustment from the baseline useful life); indicated damage to an asset from images or notes can negatively impact the threshold age; previously performed repairs can positively impact a threshold age, while repeated repairs can negatively impact threshold age; information (e.g., images, notes) indicating good condition can positively impact threshold age; etc. The threshold age can also be affected by factors not directly associated with a particular asset. In a particular example, the threshold age associated with all or a subset of assets can be adjusted (e.g., increased or decreased), thus requiring less or more manual approvals (e.g., the threshold age of various assets can be increased or decreased based on a maintenance budget for a facility; or set configurations for a facility). As another more particular example, process 500 can automatically approve a task based on agreement of a user input indicative of a current condition of an asset (e.g., "needs replacement") and another indication of a condition of the asset (e.g., the asset exceeding a threshold age, a quantitative metric indicative of a condition of the asset indicating, that the asset is ready for replacement, etc.). As yet another more particular example, process 500 can require manual approval of a task if there is disagreement between a user input indicative of a condition of an asset (e.g., "needs replacement") and another indication of a condition of the asset (e.g., the asset not exceeding a threshold age, a quantitative metric indicative of condition of the asset indicating that the asset is not ready for replacement, etc.). Agreement can be within a configurable margin (e.g., within a set time of the threshold age, within a set margin of a threshold quantitative metric).

As still another example, process 500 can automatically approve a task (e.g., a replacement task) if an estimated quantitative metric indicative of a condition of an asset a configured threshold metric determined for an asset requiring replacement or repair (e.g., exceeds a threshold when higher values of the metric indicate poorer condition, or is below a threshold when lower values of the metric indicate poorer condition), and can require manual approval if the quantitative metric below a configured threshold value. As described above, the quantitative metric can be an output of a model that uses various inputs relating to current or previous condition of an asset (e.g., images, notes, history, and resident information such occupancy length, actual occupancy time, use of a wheelchair or other mobility device, etc.).

As a further example, process 500 can automatically approve a task based on agreement of the user input indicative of a current condition (e.g., "needs replacement") and an estimated current condition (e.g., predicted condition from a model) for an asset, and can require manual approval if there is disagreement between the user input indicative of a current condition (e.g., "needs replacement") and an estimated current condition for an asset (e.g., indicating that the asset is not due for replacement). Agreement may be allowed within a configurable margin (e.g., based on quantitative metric for an indicated condition and estimated condition).

In some embodiments, process 500 can receive maintenance budget information and current maintenance expenses (e.g., including expenses associated with repairing and/or replacing assets associated with a unit turn) for a time period for a facility from an appropriate database. Process 500 can utilize this information to override automatic approval settings, such that at least some tasks (e.g., replacement tasks, or tasks that have a cost above a limit) require manual approval when current maintenance expenses have exceeded the maintenance budget for a facility.

In some embodiments, process 500 can require manual approval for replacement of an asset in response to a disagreement between different sources indicative of a condition of the asset. For example, a user can input condition information indicating whether the asset requires maintenance, repair, replacement, etc. As another example, process 500 can determine whether replacement is due (e.g., based on a useful life of the asset and an age of the asset, based on a quantitative metric indicative of the condition of the asset), whether maintenance is due (e.g., based on maintenance records), etc. If one source differs from another source (e.g., if user input indicates that an asset should be replaced, and process 500 indicates that the asset is likely not in need of replacement; or if a user input indicates that an asset should not be replaced, and process 500 indicates that the asset is likely in need of replacement), process 500 can determine that there is disagreement between different sources regarding a task to be performed in connection with the asset. In some embodiments, in response to determining that there is disagreement about a task and/or asset, process 500 can require manual approval to perform the task (or, in some examples, not perform a replacement when process 500 determines that replacement is due). Additionally or alternatively, in some embodiments, process 500 can prompt a user to provide additional input in response to determining that there is disagreement about a task and/or asset. For example, if a user provides input indicating that replacement of an asset is due, and process 500 determines that replacement is not due, process 500 can prompt the user to provide additional input explaining in more detail why the user believes that replacement is due.

In some embodiments, process 500 can determine whether to require manual approval of a task (e.g., replacement of an asset, repair of an asset, etc.) based on whether the task is expected to facilitate an increase (or maintenance) of the rate associated with the unit (e.g., monthly rent, daily rate, etc.). For example, process 500 can receive information indicative of a target rate associated with the unit (e.g., based on various factors such as a view from the unit, rates charged for similar units in the same geographic area, etc.) and a current rate charged for the unit, and process 500 can determine whether performing the task is consistent with charging the target rate for the unit. In a more particular example, if the target rate is higher than the current rate, process 500 can determine that replacing an asset (e.g., with a specific replacement asset, which may be newer and/or a higher tier of asset) is consistent with increasing the rate, and thus can determine that manual approval is not required to perform the task (e.g., process 500 can automatically approve such a task). In another more particular example, if the target rate is higher than the current rate, process 500 can determine that repairing an asset (e.g., a relatively old and/or a relativity low tier asset) is not consistent with increasing the rate, and can require manual approval.

In some embodiments, process 500 can estimate a return on investment (ROI) of performing a task, and determine whether manual approval is needed based on the ROI. For example, process 500 can receive information indicative of a target rate associated with the unit and a current rate charged for the unit, and process 500 can estimate the ROI of performing the task based on the cost associated with the task and an expected difference in the rate that can be charged for the unit (or lack of change) if the task is performed or not performed. In such an example, if the ROI is positive and/or above a threshold, process 500 can determine that manual approval is not required to perform the task (e.g., process 500 can automatically approve the task). Otherwise, if the ROI is negative and/or below a threshold, process 500 can determine that manual approval is required to perform the task.

If process 500 determines that one or more manual approvals are needed ("YES" at 516), process 500 can move to 518. At 518, process 500 can cause a detailed approval request to be provided to a designated user for each task that requires manual approval. Note that different users may be designated as approving different tasks, and/or expenses that fall within a certain range. For example, a user associated with a facility (e.g., an on-site manager of the facility) can be designated as an approver for tasks with relatively low expected costs and/or when approval is needed to replace an asset before an end of an expected useful lifetime of the asset (e.g., where the cost associated with replacement may not otherwise indicate that approval is needed). As another example, a user associated with an operator (e.g., a corporate user) can be designated as an approver for tasks that exceed a limit, and/or when approval is needed to replace an asset before an end of an expected useful lifetime of the asset.

In some embodiments, process 500 can provide information to the designated user that can facilitate a manual approval decision by the designated user. For example, process 500 can provide an indication of a current condition as assessed by a user managing the unit turn (e.g., a qualitative indication of current condition, and/or notes), one or more images of the asset that is indicated as needing replacement (e.g., previous and/or current images), an estimated current condition (e.g., a qualitative value), an asset history associated with the asset, an expected cost associated with replacement of the asset, an age and a baseline and/or adjusted threshold life of the asset, etc. The provided information can also include a recommendation based on estimated condition, cost, scheduling, prioritization, and other factors inputted into a machine learning model (e.g., "recommend replacement", "recommend repair").

At 520, process 500 can determine whether the task has been approved. If process 500 determined that task (e.g., replacement task) has not been approved ("NO" at 520), process 500 can return to 512 to identify a task to be performed in connection with the asset (e.g., process 500 can schedule the asset for repair in lieu of replacement).

Otherwise, if process 500 determines that no approvals are needed ("NO" at 516) or that all tasks (e.g., replacement tasks) needing approval have been approved ("YES" at 520), process 500 can move to 522. At 522, process 500 can select and schedule contractors to perform tasks that cannot be performed efficiently by an internal user (e.g., a maintenance employee).

At 524, process 500 can schedule tasks to be performed by internal users based on the schedule of tasks to be performed by contractors, and/or based on other tasks that the internal users are scheduled to perform. In some embodiments, process 500 can provide information about the unit and information about one or more other units being turned over to a model (e.g., a machine learning model), and can receive output from the model indicative of a priority for scheduling the unit turns. For example, process 500 can provide any suitable information about the units, such as move out dates, attributes, rent, etc. As another example, process 500 can provide any suitable information about demand for units, such as occupancy of similar units, time to occupancy for similar units, etc.

In some embodiments, process 500 can receive input as tasks are completed, and can update any suitable database (e.g., with updated asset information). After all tasks related to assessment, repair, and/or replacement of assets are completed, process 500 can cause a notification to be provided to an appropriate user (e.g., a user associated with sales and/or marketing, an employee associated with housekeeping, etc.) indicating that the unit turn is complete and/or ready for a next step (e.g., cleaning, sign-off by cleaning staff, sign-off by sales and/or marketing, etc.). Alternatively, a user can indicate that the unit turn is complete, regardless of whether one or more tasks related to assessment, repair, and/or replacement of assets, and process 500 can cause a notification to be provided to an appropriate user (e.g., a user associated with sales and/or marketing, an employee associated with housekeeping, etc.) indicating that the unit turn is complete and/or ready for a next step (e.g., cleaning, sign-off by cleaning staff, sign-off by sales and/or marketing, etc.).

Figure 6:
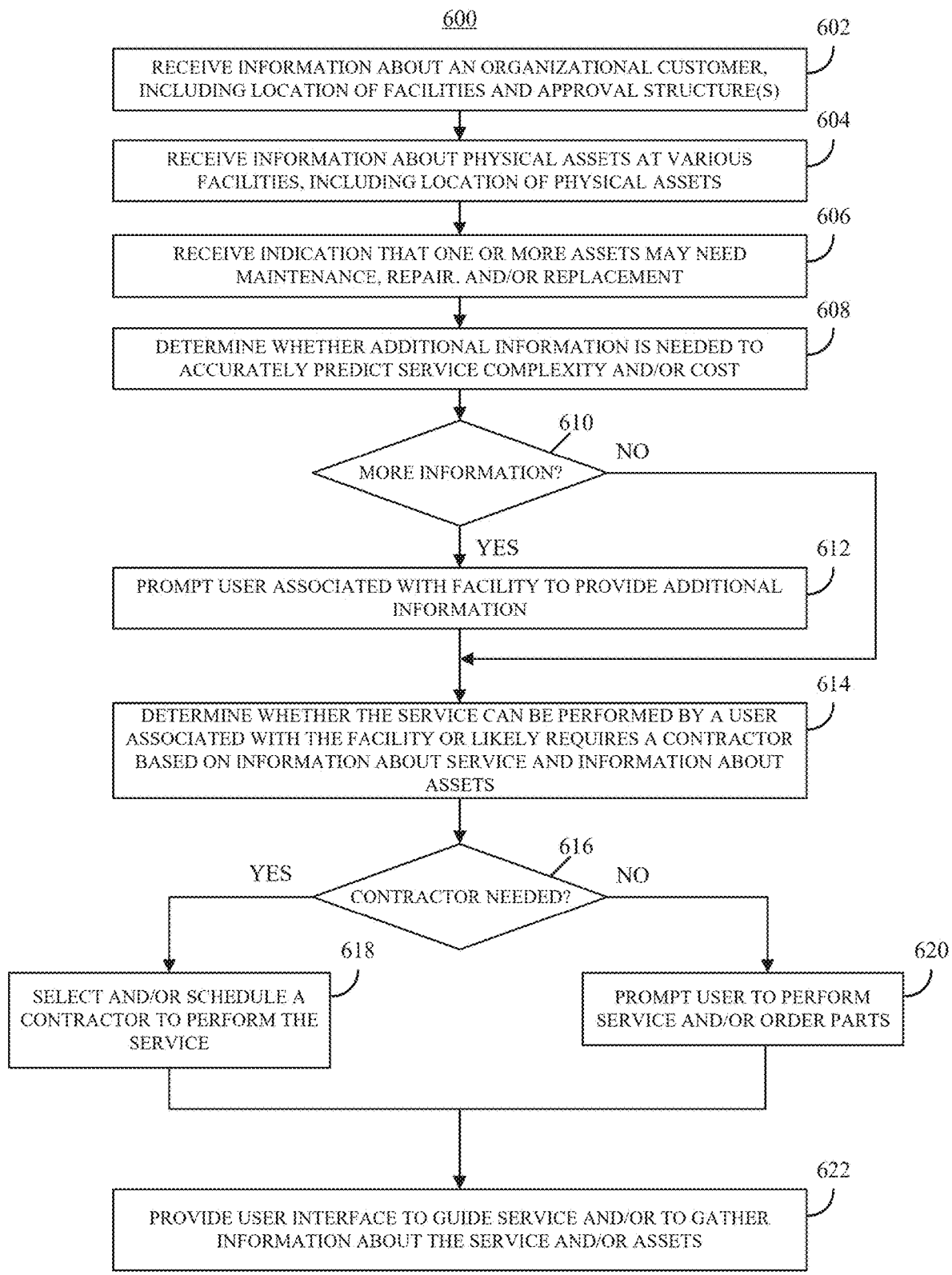
FIG. 6 shows an example of a process for automatically optimizing maintenance associated with an asset in accordance with some embodiments of the disclosed subject matter.

FIG. 6 shows an example of a process for automatically optimizing maintenance associated with an asset in accordance with some embodiments of the disclosed subject matter. At 602, process 600 can receive information about an organizational customer, such as locations of facilities, and approval structures (e.g., an expense limit below which approval may not be needed, one or more users that are designated as approvers, etc.).

At 604, process 600 can receive information about physical assets at various facilities, including a location of the physical assets (e.g., a unit in which the assets are located, another location at which the assets are located, etc.). For example, as assets are replaced, process 600 can receive information about newly installed assets. As another example, process 600 can prompt a user to provide information about physical assets in various parts of a facility.

At 606, process 600 can receive an indication that that one or more assets may need maintenance, repair, and/or replacement. In some embodiments, such an indication can be received from any suitable source, such as a resident of a facility (e.g., requesting maintenance, repair, and/or replacement of an asset), a staff member (e.g., indicating that a particular asset may need maintenance, repair, and/or replacement), a maintenance employee (e.g., indicating that a particular asset may need maintenance, repair, and/or replacement), etc.

At 608, process 600 can determine whether additional information is needed to accurately predict how complex servicing (e.g., performing maintenance, repairing, and/or replacing) the asset is likely to be, and/or a likely costs of servicing the asset (e.g., a cost of hiring a contractor to perform the work, an opportunity cost associated with having an employee perform the work, etc.).

If process 600 determines that more information is needed ("YES" at 610), process 600 can move to 612, and can prompt a user associated with a facility to provide additional information (e.g., via an application executed by a computing device associated with the user, via a web browser, etc.), and upon receiving additional information, can move to 614. For example, process 600 can prompt a user to capture images of the asset, assess a condition of an asset, answer one or more questions intended to solicit information that can be used to determine what service is needed to resolve the need identified at 606.

Otherwise, if process 600 determines that more information is not needed ("NO" at 610), process 600 can move to 614. At 614, process 600 can determine whether the service can be performed by a user associated with the facility (e.g., whether the user is capable of performing the service, whether the user has time to perform the service, etc.) using any suitable technique or combination of techniques. In some embodiments, process 600 can receive maintenance budget information and current maintenance expenses for a time period for a facility from an appropriate database. Process 600 can optimize based on cost, budget, and scheduling to determine whether a user associated with the facility, or an outside contractor should perform the task. For example, process 600 can determine that a contractor cannot perform the task based on a likely cost of the contractor and a total maintenance budget for the facility and current maintenance expenses for a time period. In such an example, process 600 can delegate the task(s) to a user associated with the facility capable of performing the service and can adjust the tasks accordingly.

If a contractor is needed to perform the service ("YES" at 616), process 600 can move to 618, and can select and/or schedule a contractor to perform the service. For example, process 600 can select a best contractor for the facility in which the asset is located (e.g., a contractor with a service area that includes the facility), a best contractor for the service task to be performed (e.g., a contractor that has performed similar services in the past), a contractor that can perform the task within a time window in which the task needs to be completed (e.g., based on a response time associated with the contractor), a best contractor that can perform the task for a likely cost below a threshold (e.g., based on a calculated likely cost for a service determined from an hourly cost of the contractor and average time to complete similar services by the specific contractor and/or similar contractors).

Otherwise, if a contractor is not needed to perform the service ("NO" at 616), process 600 can move to 620, and can prompt an internal user to perform the service and/or order items that may be needed to perform the service.

At 622, process 600 can provide a user interface that can be used to guide performance of the service task, and/or that can prompt a user (e.g., an internal user, a contractor, etc.) to provide information about the service being performed and/or the asset being services (e.g., on which maintenance is being performed, which is being repaired, a replacement for the asset, etc.).

Figure 7:
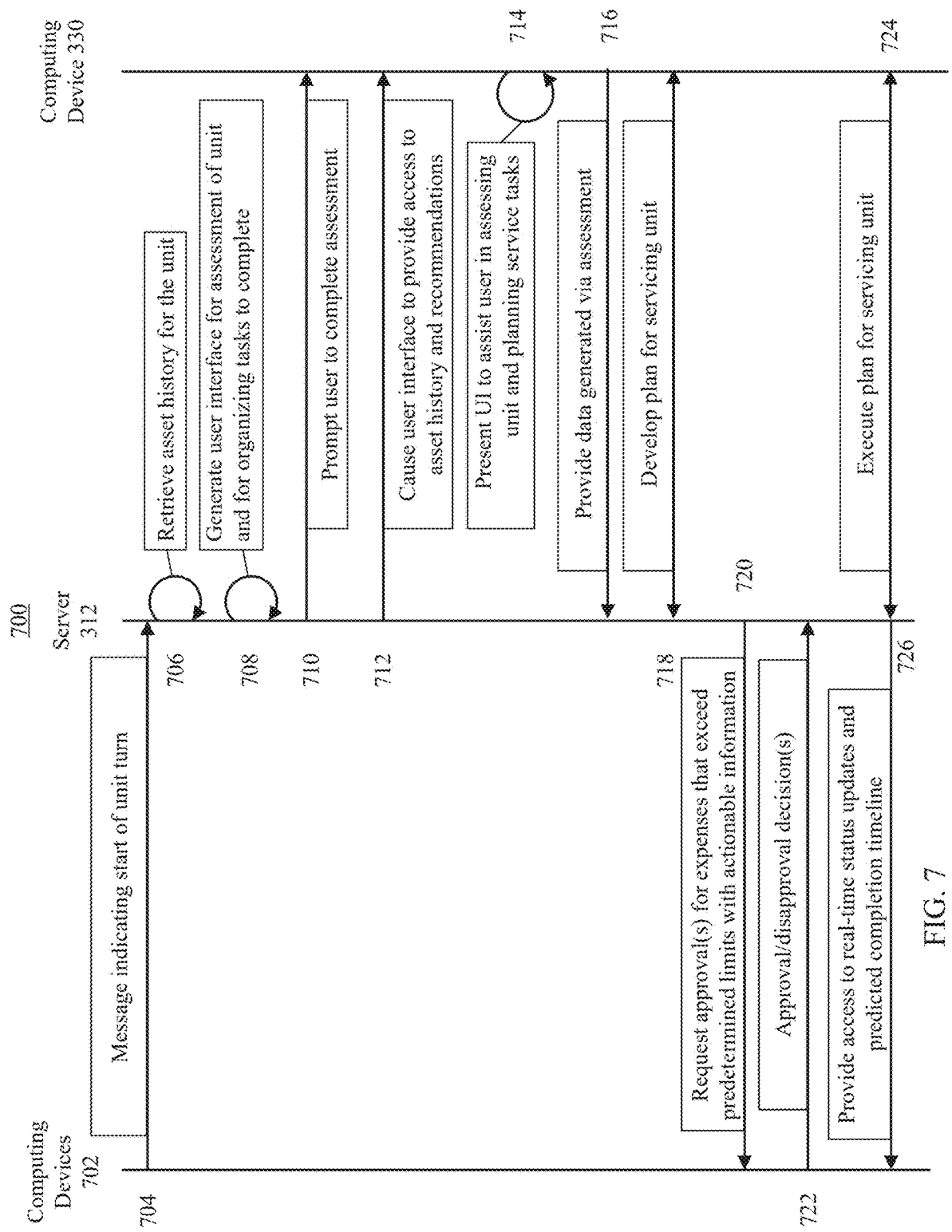
FIG. 7 shows an example of an information flow for automatically optimizing maintenance associated with a unit turn in accordance with some embodiments of the disclosed subject matter.

FIG. 7 shows an example of an information flow for automatically optimizing maintenance associated with a unit turn in accordance with some embodiments of the disclosed subject matter. As shown in FIG. 7, a computing device 702 can send a message, at 704, to server 312 (e.g., executing maintenance management system 202) indicating that a unit turn is started and/or that a unit turn is scheduled for a particular time.

At 706, server 312 can retrieve asset history information for the unit (e.g., from an asset database).

At 708, server 312 can generate a user interface to be used to assess the unit and/or to organize the unit turn (e.g., as described above in connection with FIG. 5).

At 710, server 312 can transmit a message to a computing device 330 associated with a user to prompt the user to complete an assessment of the unit. For example, server 312 can transmit a push notification, an email, an SMS message, etc.

At 712, server 312 can cause the user interface to provide access to asset history information retrieved at 706 and/or any recommendations (e.g., based on a useful life of an asset(s) in the unit). For example, server 312 can transmit a message(s) that include instructions and/or content to cause computing device 330 to present the user interface generated at 708.

At 714, computing device 330 can present the customized user interface to assist the user in assessing the unit and/or planning service tasks to place the unit back into service.

At 716, computing device 330 can transmit data to server 312 generated via the assessment (e.g., data input to the customized user interface, one or more images, etc.).

At 718, server 312 can develop a plan for servicing the unit and placing the unit back into service (e.g., as described above in connection with FIG. 5).

At 720, server 312 can request manual approval from a user associated with a computing device 702 (e.g., a user associated with an operator of a facility) for expenses that exceed a predetermine limit(s) with actionable information that can be used to determine whether to approve an expense. For example, as described above in connection with FIG. 5, notes, images, asset history, etc. can be provided to facilitate an efficient approval decision by the approver. Note that a computing device that provided a message indicating a start of a unit turn may not be the same computing device that presents an approval request.

At 722, computing device 702 can provide an approval or disapproval decision to server 312.

At 724, server 312 and computing device 330 can communicate information as the plan for servicing the unit is carried out. For example, as tasks are completed, a user of computing device 330 can provide input indicating that a task has been completed.

At 726, server 312 can provide access to real-time status updates via a user interface presented by a computing device 702, which can include a projected completion timeline.

Figure 8:
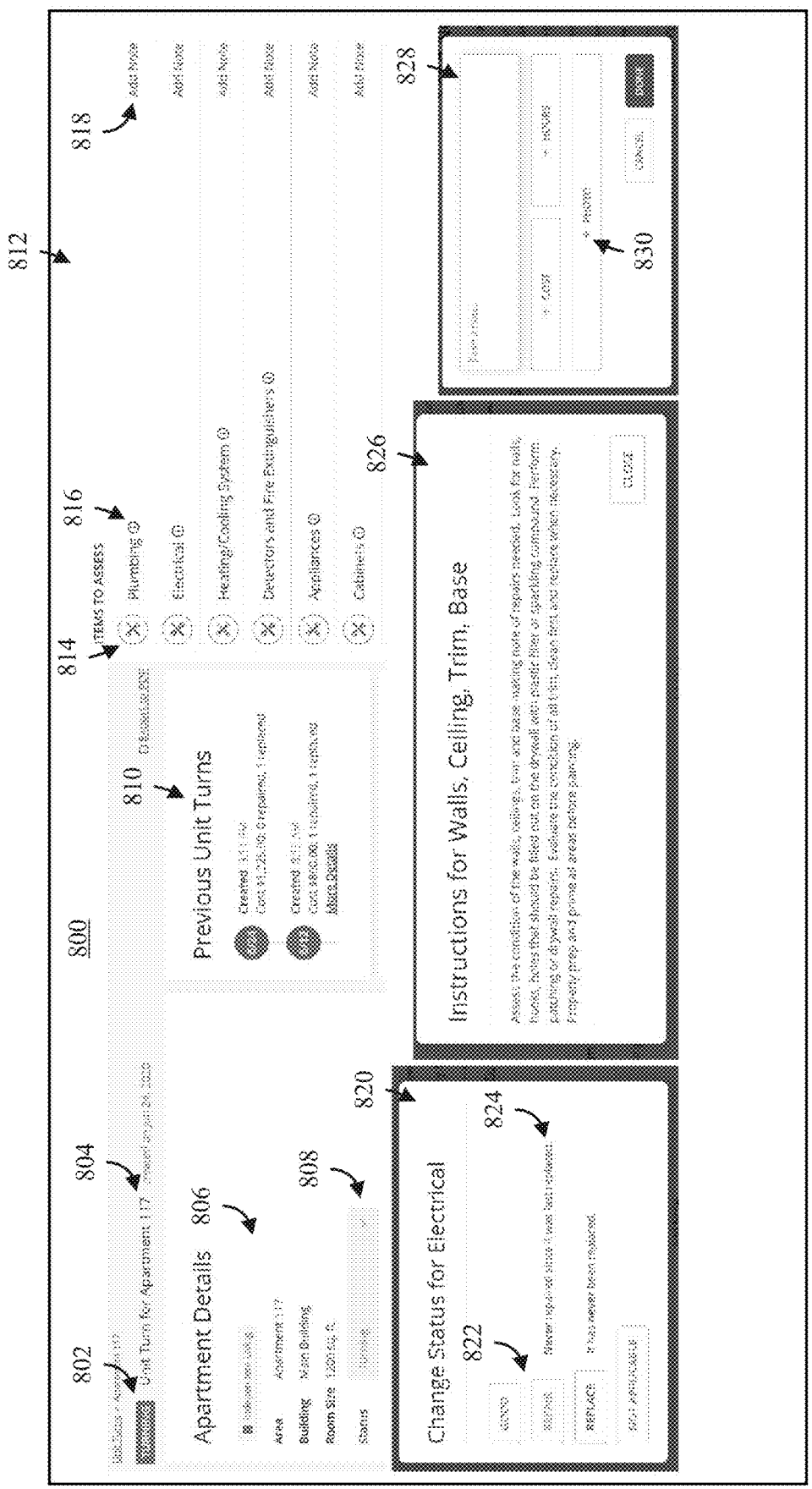
FIG. 8 shows an example of a customized user interface for optimizing maintenance associated with a unit turn in accordance with some embodiments of the disclosed subject matter.

FIG. 8 shows an example 800 of a customized user interface for optimizing maintenance associated with a unit turn in accordance with some embodiments of the disclosed subject matter.

As shown in FIG. 8, mechanisms described herein can cause a customized user interface 800 to be generated for presentation to a user. Customized user interface 800 can include a status 802 showing whether the current unit is occupied, ready for sale, ready to be turned over, currently turning over, and/or any other status. In FIG. 8, the unit is in process of being turned, and the "turning" status 802 can indicate that status to a user.

Customized user interface 800 can include identifying information 804 identifying a unit that is being turned over, and information 806, such as a type of facility the unit is associated with (e.g., independent living), identifying information of the unit (e.g., Apartment 117), a structure or facility in which the unit is located (e.g., Main Building), a room size (e.g., 1200 square feet). Customized user interface 800 can also include a status user interface element 808. In the example of FIG. 8, status user interface element 808 is greyed out, which can indicate that the status cannot be changed (e.g., because one or more criteria have not been met, such as assessment of all assets associated with the unit).

Customized user interface 800 can include unit turn information 810, which can present information about one or more previous unit turns that were performed, and can include a summary of some information associated with the unit turn, such as the date when the unit turn was created, performed, and/or completed, a cost associated with the previous unit turn, and a summary of one or more tasks carried out in connection with the previous unit turn (e.g., a number of assets repaired, replaced, etc.).

Customized user interface 800 can include an area 812 showing assets associated with the unit to be assessed, and/or that have been assessed. For example, area 812 can include a list of assets, which can each be associated with various selectable user interface elements and/or non-selectable user interface elements.

As another example, area 812 can include a first selectable user interface element 814, a second selectable user interface element 816, and a third selectable user interface element 818. Selection of first selectable user interface element 814 can cause a status user interface 820 to be presented, which can include a set of selectable user interface elements 822 for inputting a current condition of the asset, and asset history information 824 indicating when a last repair or replacement of the asset was performed for the current unit.

Selection of second selectable user interface element 816 can cause an instruction user interface 826 to be presented, which can include instructions for assessing the condition of the asset associated with the selected user interface element.

Selection of third selectable user interface element 818 can cause a notes user interface 828 to be presented, which can include a field for entering notes (e.g., as text, as audio), and selectable user interface elements for entering certain types of information, such as cost associated with repair or replacement of the asset, a time spent assessing, repairing, and/or replacing the asset, and a photo user interface element 830, selection of which can facilitate submission of one or more images associated with the asset. For example, selection of photo user interface element 830 can cause a device presenting user interface 800 and/or notes user interface 828 to launch a camera application that can be used to capture an image, to allow a previously taken image to be uploaded (e.g., from a photos application on the device, from a file system, etc.).

Note that although customized user interface 800 is shown as presenting various user interface elements together, this is merely an example, and different portions of the user interface and/or different user interfaces can be presented separately (e.g., based on a size of a screen being used to present customized user interface 800). For example, selection of a first selectable user interface element 814 can cause status user interface 820 to be presented. In such an example, status user interface 820 can be presented in lieu of customized user interface 800, and selection of a status user interface element 822 can cause presentation of status user interface 820 to cease (e.g., to be inhibited, replaced with an updated customized user interface, etc.). Similarly, selection of a second selectable user interface element 816 can cause instruction user interface 826 to be presented, and selection of a "close" user interface element in instruction user interface 826 can cause presentation of instruction user interface 826 to cease (e.g., to be inhibited, replaced with an updated customized user interface, etc.).

Figure 9A:
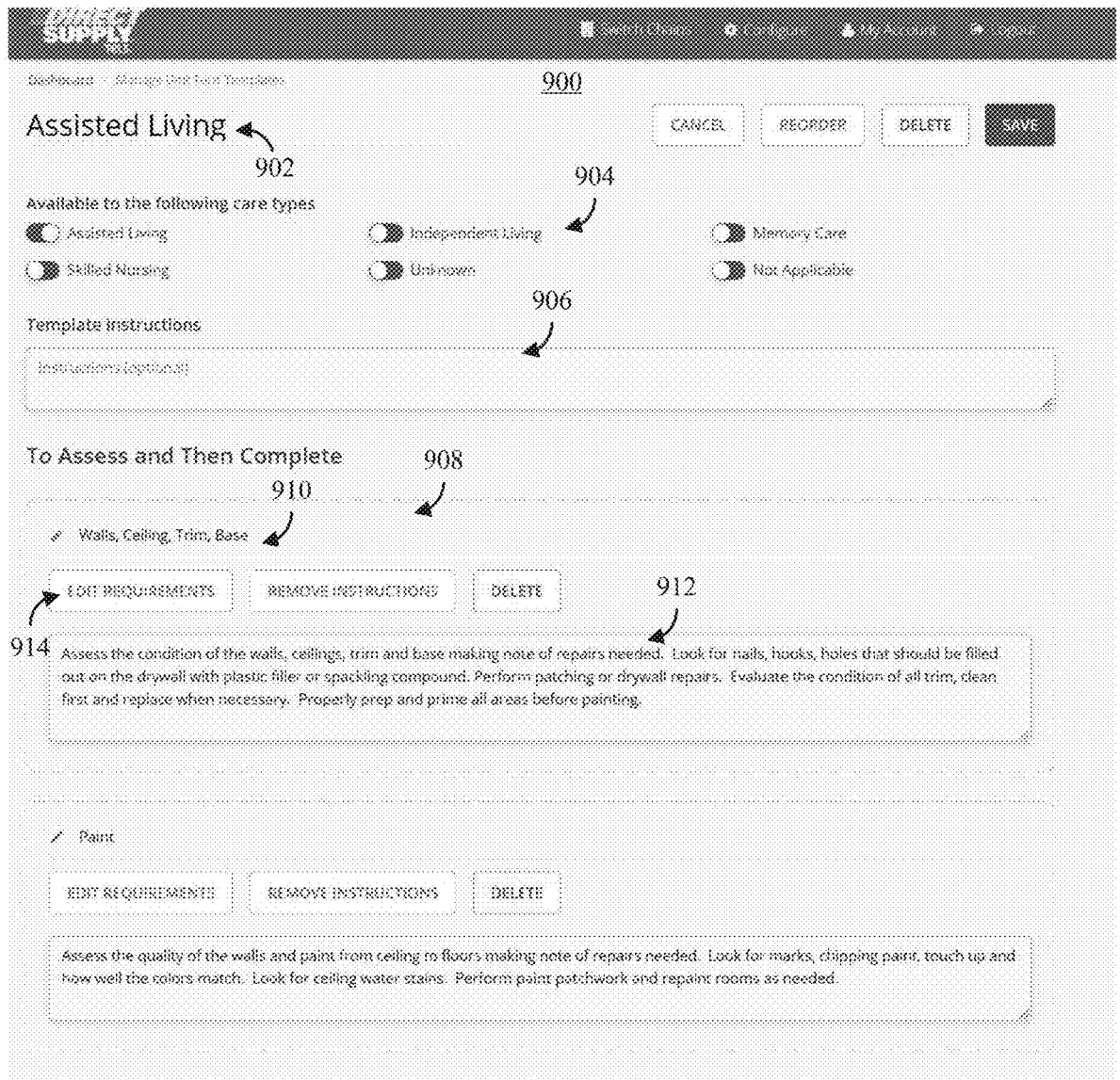
FIG. 9A shows an example of a user interface for generating a template for optimizing maintenance associated with a unit turn in accordance with some embodiments of the disclosed subject matter.

FIG. 9A shows an example 900 of a user interface for generating a template for optimizing maintenance associated with a unit turn in accordance with some embodiments of the disclosed subject matter.

As shown in FIG. 9A, user interface 900 can be used to edit a unit turn template that can be used to generate a customized user interface associated with a particular unit turn. In some embodiments, user interface 900 can include a title 902 (e.g., identifying which type(s) of facility the template is intended for), a set of toggle user interface elements 904 that can be selected to associate the template with different types of facilities (e.g., a facility and/or units within a facility can be associated with a "type," and templates associated with that type can be selectable and/or automatically selected when a unit turn is created).

Additionally, user interface 900 can include a field 906 for entering information about the template (e.g., instructions about when to use the template), and user interface portions 908 associated with various assets. Each portion 908 can be associated with identifying information 910, an instruction field 912 that can be used to edit instructions to be presented when an instruction selectable user interface element associated with the asset (e.g., in customized user interface 800) is selected. Additionally, each portion 908 can be associated with a requirements user interface element 914 that can be used to specify when notes and/or images are required to be entered when assessing the condition of the asset.

Figure 9B:
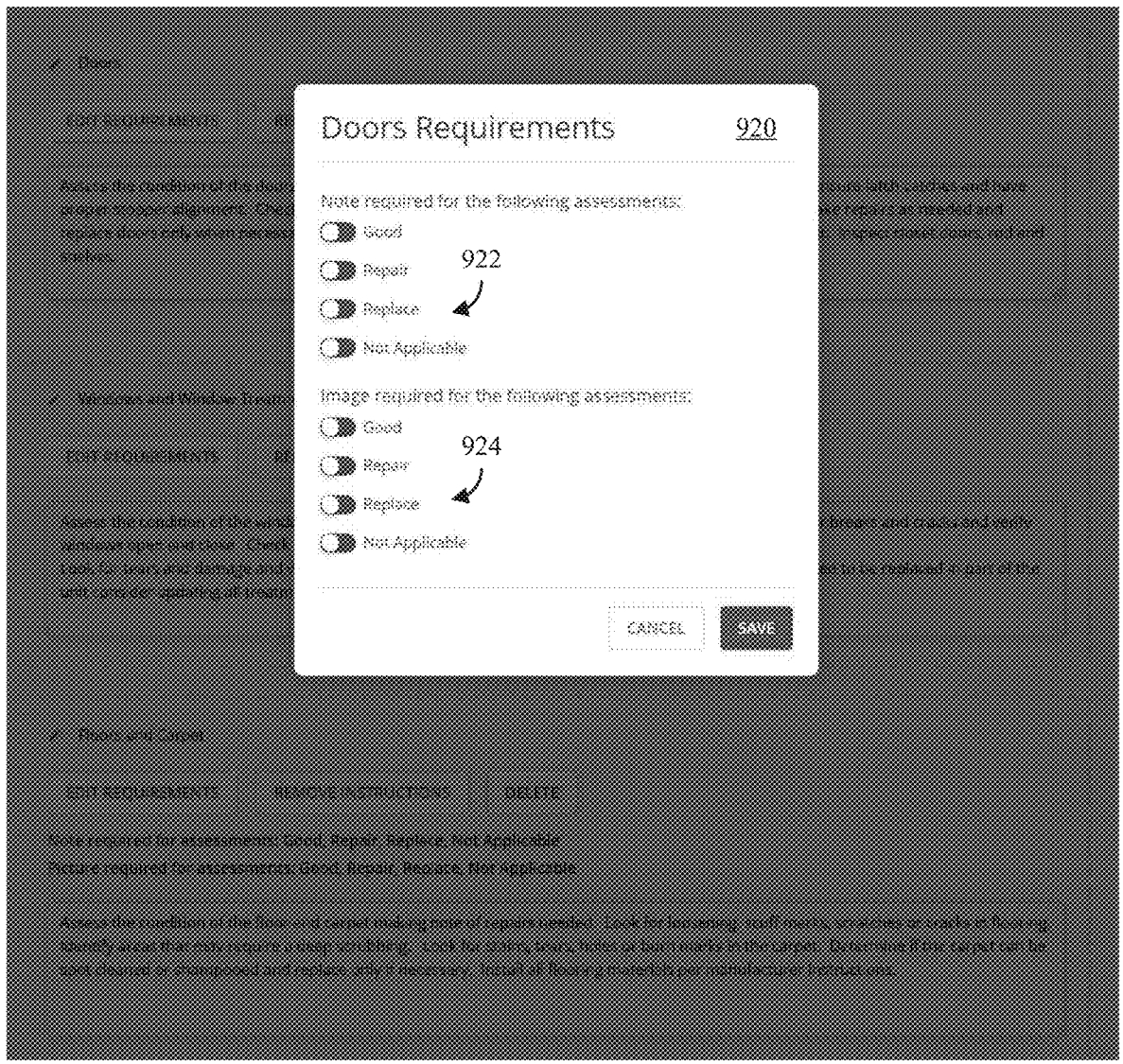
FIG. 9B shows an example of a user interface for editing documentation requirements associated with a type of asset in accordance with some embodiments of the disclosed subject matter.

FIG. 9B shows an example 920 of a user interface for editing documentation requirements associated with a type of asset in accordance with some embodiments of the disclosed subject matter.

As shown in FIG. 9B, selection of a requirements user interface element 914 can cause a requirements user interface 920 associated with a particular asset to be presented. Requirements user interface 920 can include a first set of toggle user interface elements 922 that can be selected to specify whether a note is required for various conditions of the asset, and a second set of toggle user interface elements 924 that can be selected to specify whether an image is required for various conditions of the asset. For example, if a user selected the toggle element associated with "replace"

in second set of toggle user interface elements 924, and selected "save," the template can be updated to require that a user provide an image when the condition "replace" is selected for the asset (e.g., "doors" in FIG. 9B). In such an example, when a unit turn is created using the template being edited in FIGS. 9A and 9B, mechanisms described herein (e.g., maintenance management system 202) can generate a customized user interface element that requires that an image be provided when the condition of "doors" is specified as "replace." For example, the customized user interface can prompt a user to provide an image when "replace" is selected in a status user interface associated with "doors."

FIG. 9C shows an example 930 of a user interface for editing instructions and documentation requirements associated with an activity in accordance with some embodiments of the disclosed subject matter.

As shown in FIG. 9C, user interface 930 (e.g., which may be a portion of user interface 900) can include portions associated with sign off tasks to be performed prior to a unit turn being considered complete. For example, user interface 930 can include a first sign-off task to be performed by housekeeping staff, which can include toggle user interface elements to specify whether a note and/or image is required, and a field for editing instructions that can be presented (e.g., in response to selection of a user interface element, or without user intervention) when a user is performing the task. In some embodiments, certain tasks can be associated with particular users (e.g., a marketing sign-off task can be accessible to certain users associated with marketing, sales, and/or management, while assessment tasks can be accessible to maintenance staff).

Figure 9D:
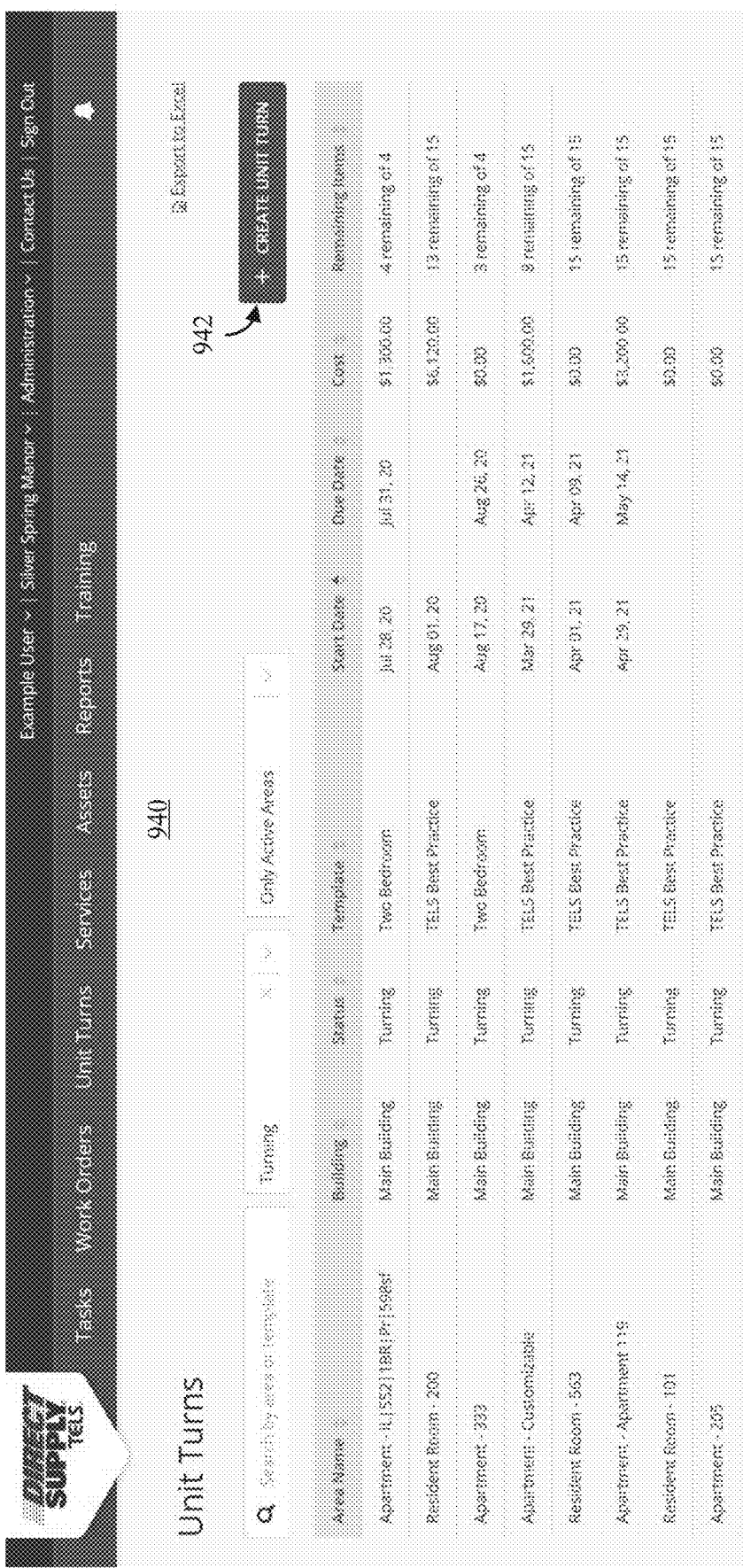
FIG. 9D shows an example of a user interface for presenting a summary of unit turns in progress for an organization in accordance with some embodiments of the disclosed subject matter.

FIG. 9D shows an example 940 of a user interface for presenting a summary of unit turns in progress for an organization in accordance with some embodiments of the disclosed subject matter.

As shown in FIG. 9D, a list of unit turns associated with a facility can be presented in user interface 940, which can include information about the in-progress unit turns, such as a name of the unit, a building in which the unit is located, a current status, a template used to generate the unit turn, a start date, a return to service data (e.g., due date), a current cost, a budget (not shown), and a number of items remaining until the unit turn is complete. Note that although user interface 940 is presenting units associated with a particular facility, this is an example, and user interface 940 can be configured to present information about units associated with an operator (e.g., across different facilities), or units associated with a property owner (e.g., across different operators and facilities). User interface 940 can include a selectable user interface element 942, selection of which can initiate creation of a unit turn (e.g., generation of a customized user interface associated with the unit turn from a selected template).

Figure 9E:
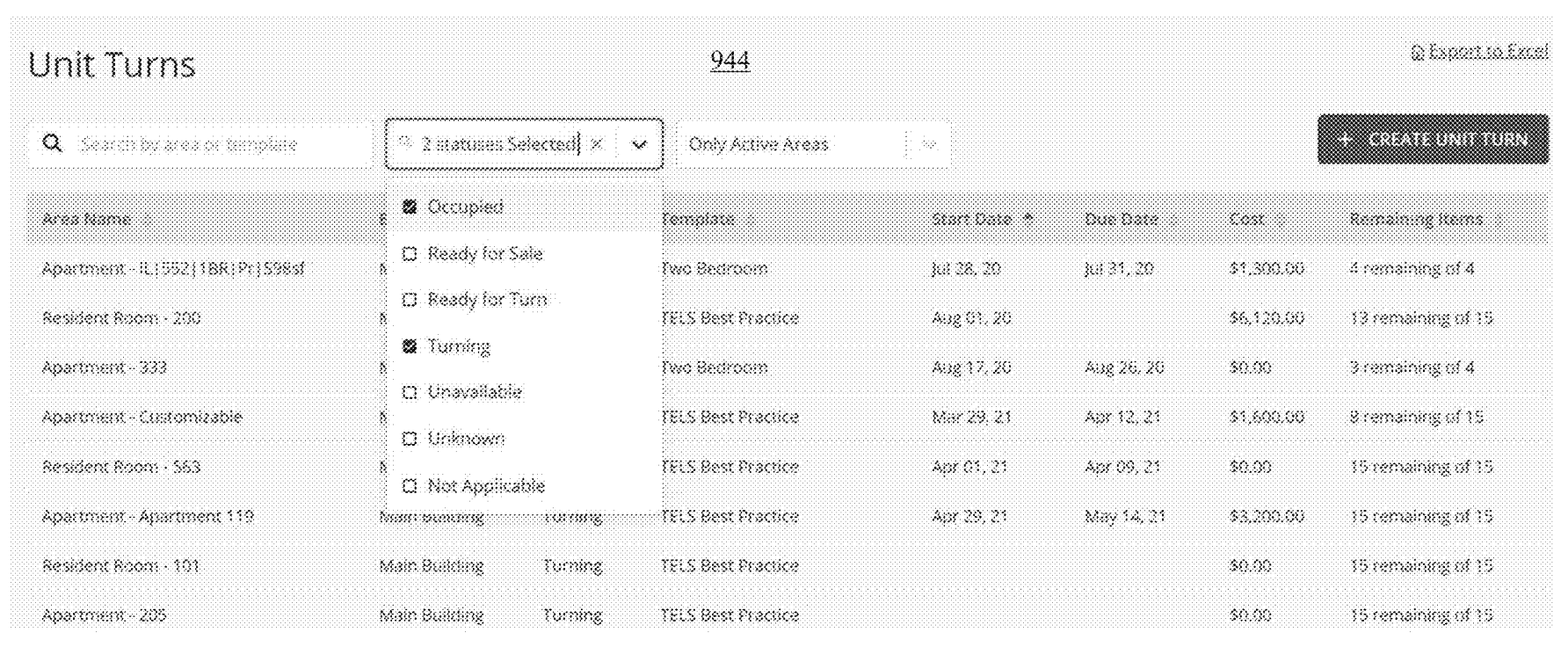

FIG. 9E shows an example 944 of a user interface for filtering units presented in a summary in accordance with some embodiments of the disclosed subject matter.

As shown in FIG. 9D, units can be filtered by status using selectable user interface elements to select one or more statuses to present in user interface 942.

Figure 9F:
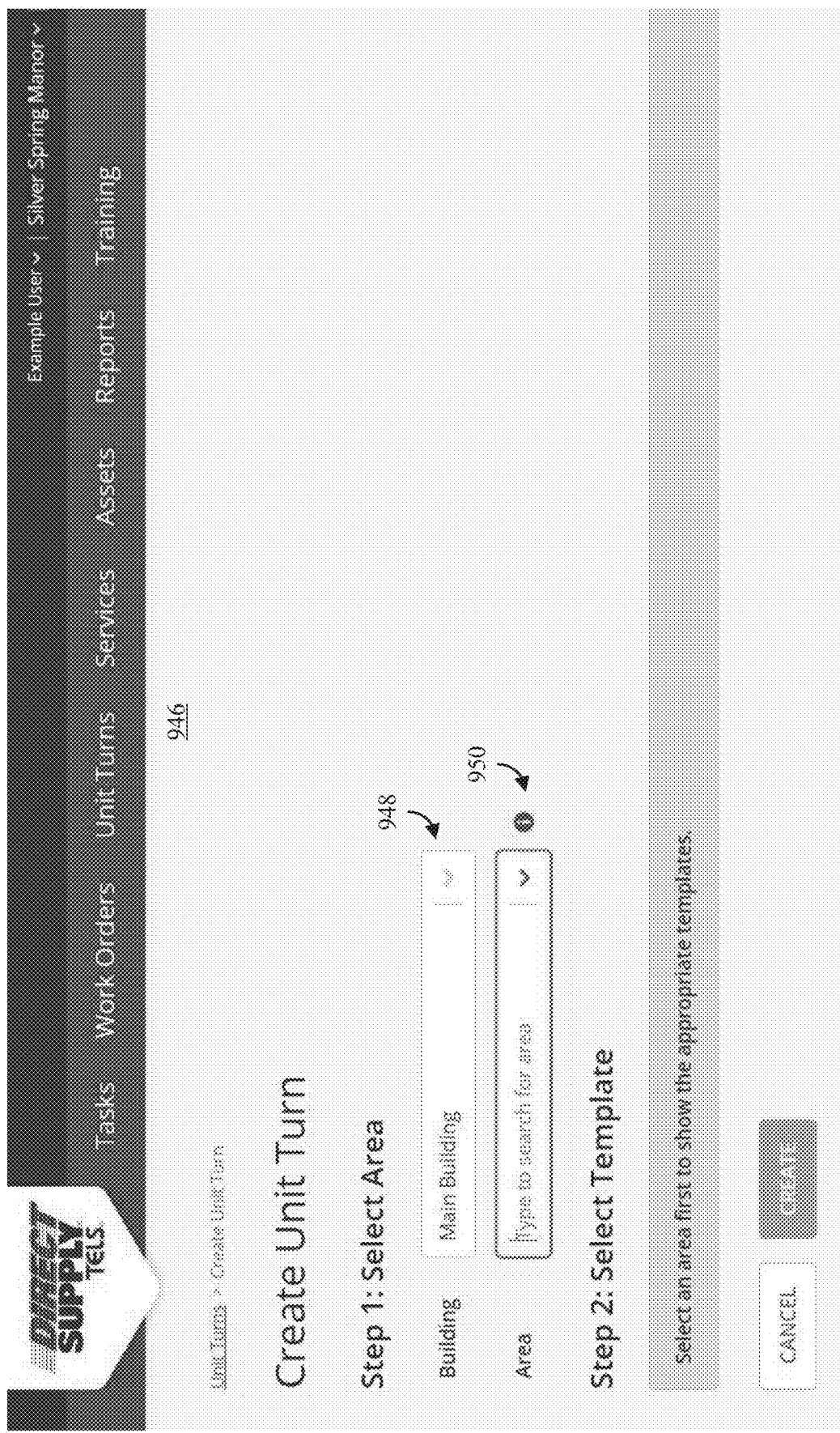
FIG. 9F shows an example of a user interface for creating a customized user interface for optimizing maintenance associated with a unit turn in accordance with some embodiments of the disclosed subject matter.

FIG. 9F shows an example 946 of a user interface for creating a customized user interface for optimizing maintenance associated with a unit turn in accordance with some embodiments of the disclosed subject matter.

In some embodiments, user interface 946 can be presented in response to selection of selectable user interface element 942, which can initiate creation of a unit turn. As shown in FIG. 9F, user interface 946 can include a drop down user interface element 948 that can be used to select a facility or portion of a facility in which the unit to be turned is located, and a second drop down user interface element 950 that can be used to select a particular unit to be turned (e.g., a room, an apartment, etc.).

Figure 9G:
FIG. 9G shows another example of a user interface for creating a customized user interface for optimizing maintenance associated with a unit turn in accordance with some embodiments of the disclosed subject matter.

FIG. 9G shows another example 956 of a user interface for creating a customized user interface for optimizing maintenance associated with a unit turn in accordance with some embodiments of the disclosed subject matter.

As shown in FIG. 9G, after a unit has been selected (e.g., using second drop down 950), information 954 about the unit can be presented (e.g., indicating a status, what type of facility the unit is associated with, a size, etc.), and a template selection portion 956 can be presented, which can include one or more available templates (e.g., as a list as shown in FIG. 9G, or using any other suitable technique, such as a third drop down, etc.). After a template has been selection, selection of a create user interface element 958 can cause a customized user interface to be generated and associated with the unit turn for the selected unit.

Figure 9H:
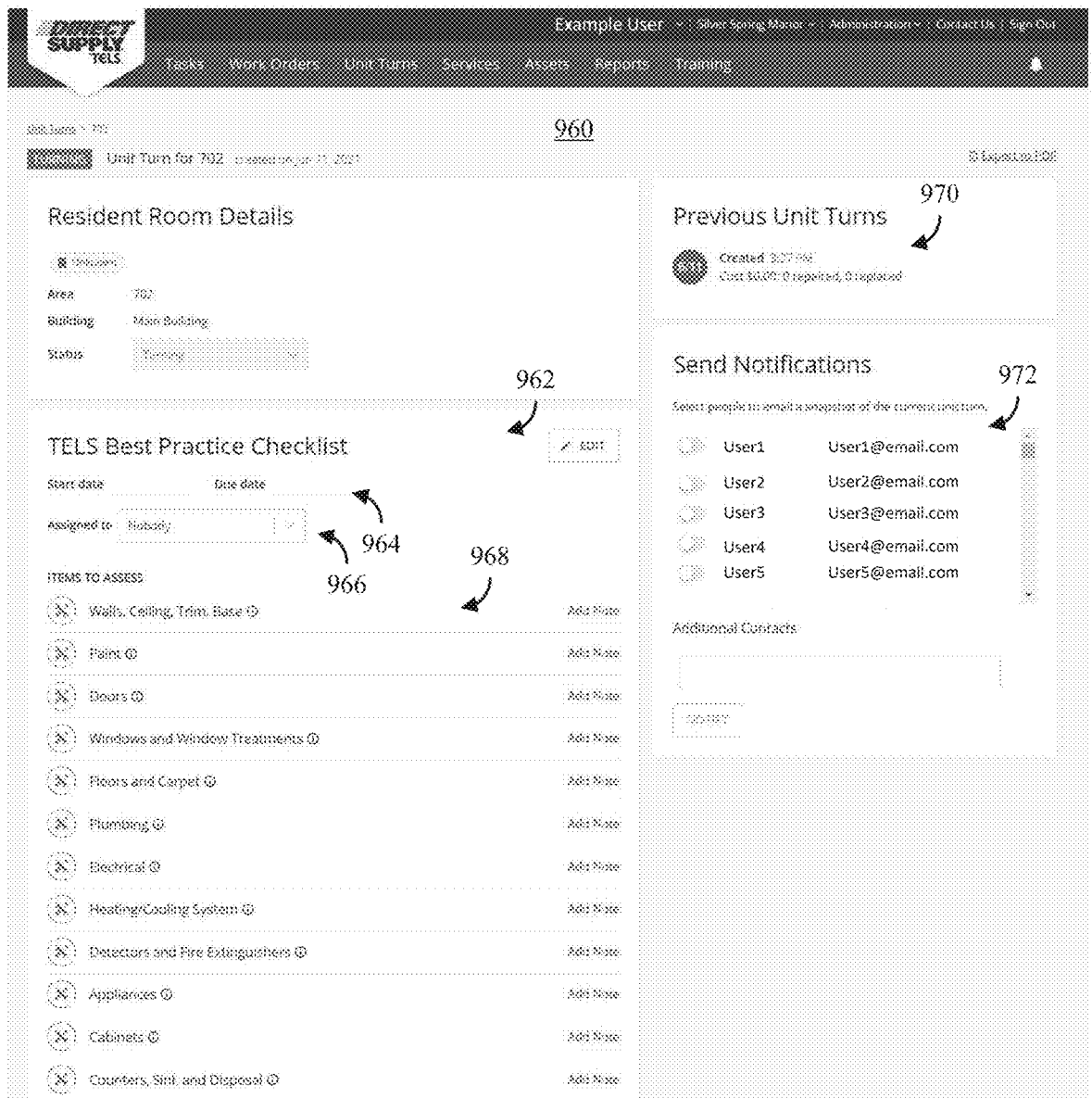
FIG. 9H shows another example of a customized user interface for optimizing maintenance associated with a unit turn in accordance with some embodiments of the disclosed subject matter.
Figure 9I:
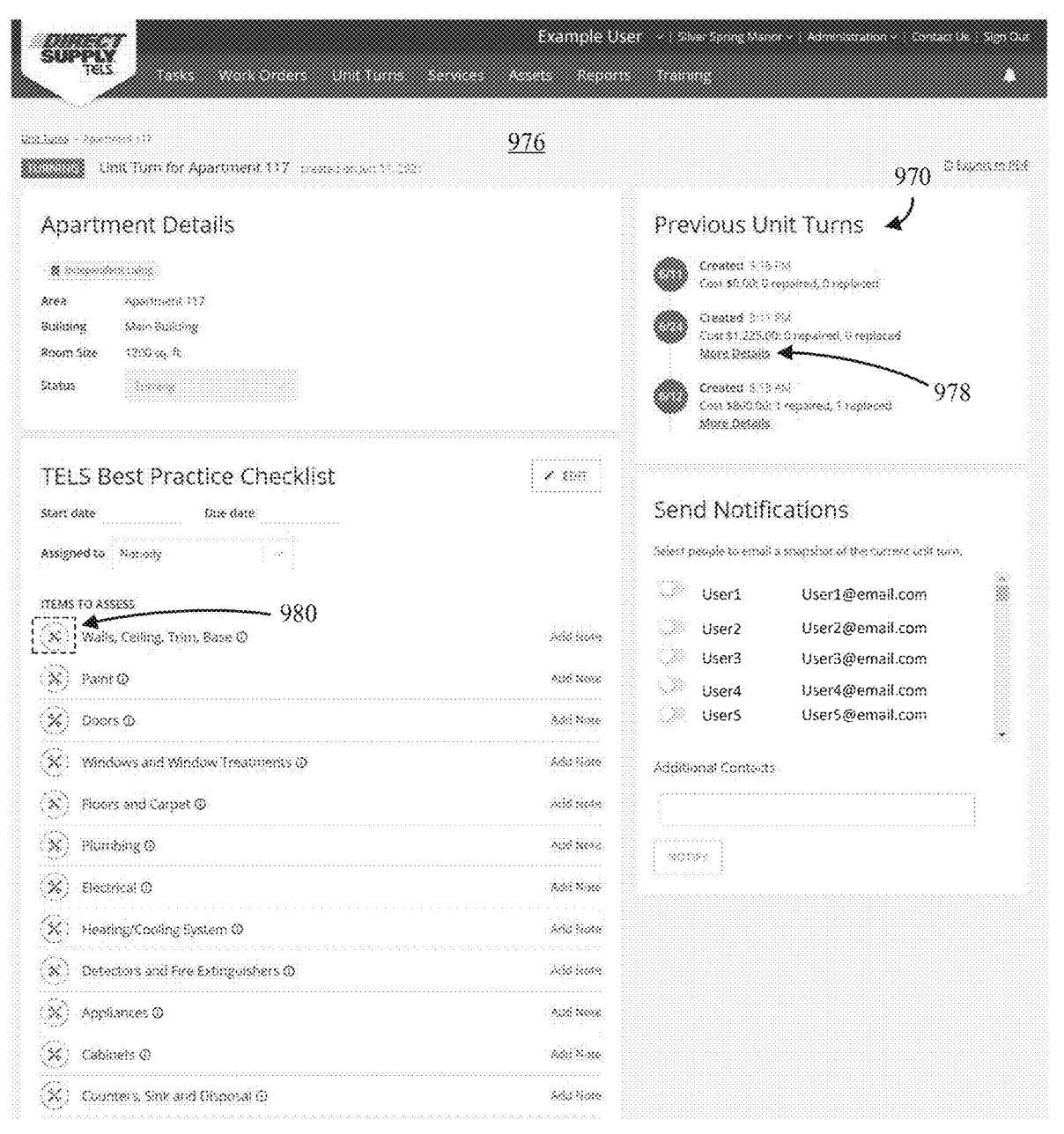
Figure 9J:
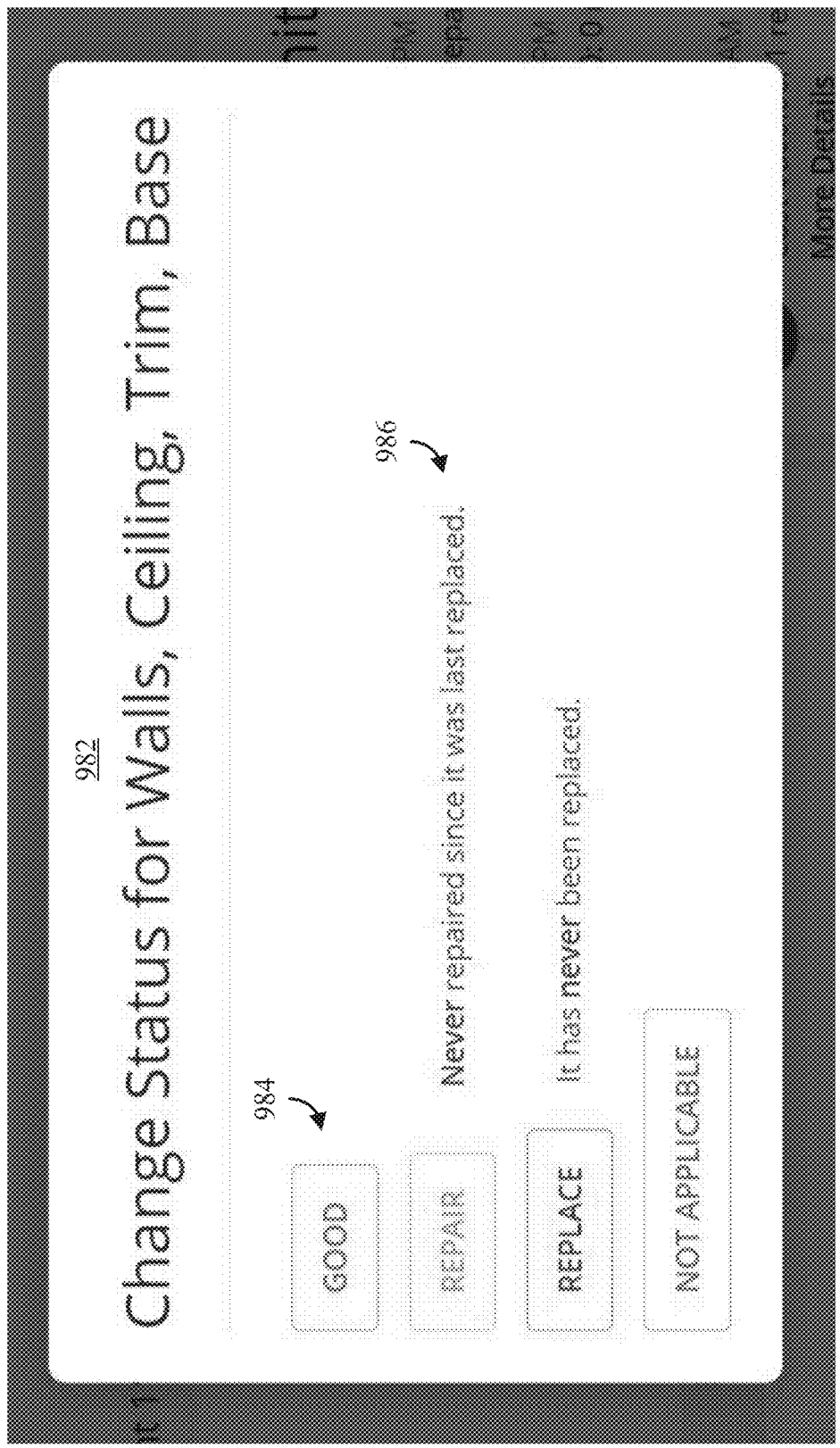
FIG. 9J shows an example of a user interface for specifying a condition of an asset associated with a unit turn in accordance with some embodiments of the disclosed subject matter.

FIG. 9H shows another example 960 of a customized user interface for optimizing maintenance associated with a unit turn in accordance with some embodiments of the disclosed subject matter.

As shown in FIG. 9H, customized user interface 960 can include similar portions to customized user interface 800, such as identifying information identifying a unit that is being turned over, and information, such as a type of facility the unit is associated with (e.g., independent living), identifying information of the unit (e.g., 702), a structure or facility in which the unit is located (e.g., Main Building), and a status user interface element. In the example of FIG. 9H, status user interface element is greyed out, which can indicate that the status cannot be changed (e.g., because one or more criteria have not been met, such as assessment of all assets associated with the unit). In some embodiments, user interface 960 can include current costs of the unit turn and/or a budget associated with the unit turn, and/or with individual assets or groups of assets.

Customized user interface 960 can include unit turn information 970, which can present information about one or more previous unit turns that were performed, and can include a summary of some information associated with the unit turn, such as the date when the unit turn was created, performed, and/or completed, a cost associated with the previous unit turn, and a summary of one or more tasks carried out in connection with the previous unit turn (e.g., a number of assets repaired, replaced, etc.).

Customized user interface 960 can include an area 962 showing assets associated with the unit to be assessed, and/or that have been assessed. For example, area 962 can include a list of assets 968, which can each be associated with various selectable user interface elements and/or non-selectable user interface elements. Additionally, area 962 can include fields 964 for entering a start date and/or a due date, and a drop down user interface element 966 to select a user to assign the unit turn to (e.g., a particular employee, a department such as maintenance or housekeeping, etc.). In some embodiments, data entered into fields 964 and/or drop down user interface element 966 can be used to populate a summary user interface, such as user interface 940 described above in connection with FIG. 9D. Additionally, customized user interface 960 can include a notification portion 972, which can include a list of people that can be notified about a current status of the unit turn (e.g., by selecting a toggle user interface element, by entering a name in a search field, etc.), and a notification can be initiated by selecting a "notify" user interface element.

In some embodiments, customized user interface 800 and/or 960 can include a notification (or other suitable user interface element) indicating that an item (e.g., a replacement asset, an item utilized to repair an asset) has been ordered, an estimated delivery date and/or time, an estimated pickup date and/or time, tracking information, etc. In some embodiments, a maintenance management system (e.g., maintenance management system 202) can determine when a delay is likely (e.g., based on tracking information associated with an order), and can notify a user and/or prompt a user (e.g., via customized user interface 800, customized user interface 960, a push notification, an email, an SMS message, etc.) to consider an alternative product that may be available more quickly at a comparable price (or a somewhat higher price if expediting procurement of the item will result in an on-time completion of the unit turn).

FIG. 9I shows yet another example 976 of a customized user interface for optimizing maintenance associated with a unit turn in accordance with some embodiments of the disclosed subject matter.

As shown in FIG. 9I, customized user interface 976 can include unit turn information 970, which can include a selectable user interface element 978 (e.g., formatted as a hyperlink), selection of which can cause details about a previous unit turn to be presented. Additionally, as described above in connection with FIG. 8, selection of a first selectable user interface element 980 associated with a particular asset (e.g., walls, ceiling, trim, base in FIG. 9I) can cause a device presenting customized user interface 976 to present a status user interface (e.g., as shown in FIG. 9J).

FIG. 9J shows an example of a user interface for specifying a condition of an asset associated with a unit turn in accordance with some embodiments of the disclosed subject matter.

As shown in FIG. 9J, a status user interface 982 can be presented to facilitate input of a current condition of an asset. Status user interface 982 can include selectable user interface elements, such as selectable user interface element 984, for inputting a current condition of the asset, and asset history information 986 indicating when a last repair or replacement of the asset was performed for the current unit. Selection of selectable user interface element 984 can cause a computing device presenting status user interface 982 to record a status associated with the selected user interface element (e.g., "good" in FIG. 9J), and cease presenting status user interface 982. For example, the computing device can present customized user interface 976 updated to show the recorded status (e.g., as shown in FIG. 9J).

FIG. 9K shows an example 988 of a user interface updated based on a specified condition of an asset associated with a unit turn in accordance with some embodiments of the disclosed subject matter.

As shown in FIG. 9K, after receiving input indicating a current condition of an asset (e.g., via status user interface 982 shown in FIG. 9J, but associated with the asset "cabinets"), the computing device can present customized user interface 988 (e.g., which may be an updated version of customized user interface 976) with the asset moved to a section of items to complete (e.g., items which have been assessed, and may or may not need repair or replacement), and can present a status identifier 990 in connection with the asset.

Further Examples Having a Variety of Features:

Implementation examples are described in the following numbered clauses:

1. A system for maintaining components of a unit using a customized graphical user interface, the system comprising: a camera; a touchscreen display; a communication system including at least one transceiver; and at least one processor programmed to: receive, from a server, a message that includes instructions to a user associated with the system to complete an assessment of a unit; receive, from the server, instructions that cause the at least one processor to present, via the touchscreen display, a customized user interface that includes a plurality of selectable user interface elements each associated with a component to be assessed of a plurality of components, the plurality of components including at least an appliance, flooring, and one or more fixtures; present, via the touchscreen display, the customized user interface; receive, via the touchscreen display, selection of a first selectable user interface element of the plurality of selectable user interface elements; in response to receiving the selection of the first selectable user interface element, instruct, via the touchscreen, the user to capture at least one image of an appliance associated with the first selectable user interface element; capture, using the camera, at least a first image of the appliance; present, via the touchscreen, a user interface portion that includes a second plurality of selectable user interface elements, each of the second plurality of selectable user interface elements associated with a condition of the appliance; receive, via the touchscreen, selection of a particular selectable user interface element of the second plurality of user interface elements; update, based on the selection of the second user interface element, a status of the appliance in the customized user interface to reflect the condition associated with the particular selectable user interface element; transmit, to the server via the communication system, the at least one image and the condition associated with the appliance; present, via the touchscreen display, an updated customized user interface including tasks to be performed by the user; receive, via the touchscreen display, input indicting completion of a first task; and transmit, to the server via the communication system, an indication that the first task has been completed.

2. The system of clause 1, wherein the at least one processor is further programmed to: in response to receiving the selection of the first selectable user interface element, cause a portion of the customizable user interface to be presented that includes a field for inputting notes, and a selectable photo user interface element; receive, via the touchscreen display, a selection of the photo user interface element; in response to receive the selection of the photo user interface element, launch a camera application usable to capture the at least one image of the appliance; and receive input to cause the camera to capture the first image.

3. The system of clause 1, wherein the plurality of components includes at least one heating system, and at least one electrical system.

4. A method for maintaining components of a unit using a customized graphical user interface, the method comprising: receiving, from a server, a message that includes instructions to a user associated with the system to complete an assessment of a unit; receiving, from the server, instructions that cause the at least one processor to present, via the touchscreen display, a customized user interface that includes a plurality of selectable user interface elements each associated with a component to be assessed of a plurality of components, the plurality of components including at least an appliance, flooring, and one or more fixtures; presenting, via a touchscreen display, the customized user interface; receiving, via the touchscreen display, selection of a first selectable user interface element of the plurality of selectable user interface elements; in response to receiving the selection of the first selectable user interface element, instructing, via the touchscreen, the user to capture at least one image of an appliance associated with the first selectable user interface element; capturing, using a camera, at least a first image of the appliance; presenting, via the touchscreen, a user interface portion that includes a second plurality of selectable user interface elements, each of the second plurality of selectable user interface elements associated with a condition of the appliance; receiving, via the touchscreen, selection of a particular selectable user interface element of the second plurality of user interface elements; updating, based on the selection of the second user interface element, a status of the appliance in the customized user interface to reflect the condition associated with the particular selectable user interface element; transmitting, to the server via a communication system comprising at least one transceiver, the at least one image and the condition associated with the appliance; presenting, via the touchscreen display, an updated customized user interface including tasks to be performed by the user; receiving, via the touchscreen display, input indicting completion of a first task; and transmitting, to the server via the communication system, an indication that the first task has been completed.

5. A non-transitory computer readable medium containing computer executable instructions that, when executed by a processor, cause the processor to perform a method for maintaining components of a unit using a customized graphical user interface, the method comprising: receiving, from a server, a message that includes instructions to a user associated with the system to complete an assessment of a unit; receiving, from the server, instructions that cause the at least one processor to present, via the touchscreen display, a customized user interface that includes a plurality of selectable user interface elements each associated with a component to be assessed of a plurality of components, the plurality of components including at least an appliance, flooring, and one or more fixtures; presenting, via a touchscreen display, the customized user interface; receiving, via the touchscreen display, selection of a first selectable user interface element of the plurality of selectable user interface elements; in response to receiving the selection of the first selectable user interface element, instructing, via the touchscreen, the user to capture at least one image of an appliance associated with the first selectable user interface element; capturing, using a camera, at least a first image of the appliance; presenting, via the touchscreen, a user interface portion that includes a second plurality of selectable user interface elements, each of the second plurality of selectable user interface elements associated with a condition of the appliance; receiving, via the touchscreen, selection of a particular selectable user interface element of the second plurality of user interface elements; updating, based on the selection of the second user interface element, a status of the appliance in the customized user interface to reflect the condition associated with the particular selectable user interface element; transmitting, to the server via a communication system comprising at least one transceiver, the at least one image and the condition associated with the appliance; presenting, via the touchscreen display, an updated customized user interface including tasks to be performed by the user; receiving, via the touchscreen display, input indicting completion of a first task; and transmitting, to the server via the communication system, an indication that the first task has been completed.

6. A method for maintaining components of a unit, the method comprising: receiving an indication that a unit is ready to be turned over; generating a customized user interface for assessment of the unit based on a template associated with the unit; retrieving information about a prior condition of one or more components associated with the unit, wherein the prior condition of each of the one or more components is associated with a time; retrieving information associated with a most recent occupant of the unit, including a length of occupancy; receiving a request, from a remote computing device, for the customized user interface; causing a link to the information about a condition of one or more components associated with the unit to be included in the customized user interface; causing the remote computing device to present the customized user interface; receiving, via the remote computing device, input indicating that a current condition of the first component indicates that the first component should be replaced; receiving, from the remote computing device, an image of the first component; determining that the first component is not due for replacement; in response to a disagreement between the input indicating that the first component should be replaced and the determination that the first component is not due for replacement, causing an authorization request to be presented to a designated user, wherein the authorization request includes the information about a prior condition of the first component, and the image of the first component; receiving, from a second remote computing device associated with the designated user, input indicating that replacement of the first component is authorized; and causing a notification to be presented via the remote computing device indicating that replacement of the first component is authorized.

7. The method of clause 6, wherein the customized user interface is configured to: prompt a user of the remote computing device to provide input indicative of a current condition of the one or more components, and prompt the user of the remote computing device to capture an image of a first component of the one or more components.

8. The method of clause 6, further comprising: estimating a current condition of the first component based on the prior condition of the first component, a time that has elapsed since the prior condition of the first component, the information associated with the most recent resident of the unit, and information about an average useful life of the first component in units similar to the unit; determining, based on the estimated condition, that the first component is not due for replacement; and in response to a disagreement between the input indicating that the first component should be replacement and the determination that the first component is not due for replacement, causing the authorization request to be presented to the designated user.

9. The method of clause 6, further comprising: determining, based on an age of the first component and a standard indicative of a minimum age for replacement, that the first component is not due for replacement; and in response to a disagreement between the input indicating that the first component should be replacement and the determination that the first component is not due for replacement, causing the authorization request to be presented to the designated user.

10. The method of clause 6, wherein retrieving information about a most recent occupant of the unit comprises: requesting information associated with the most recent occupant from an electronic health record system.

11. The method of clause 10, wherein the information associated with the most recent occupant includes an indication of whether the most recent occupant uses a motorized wheelchair.

12. The method of clause 6, wherein the first component is carpet.

13. The method of clause 6, further comprising: receiving a request to create the template; receiving input indicating one or more types of facilities to associate with the template; receiving input indicating that a plurality of types of components are to be assessed when turning over a unit; and receiving input indicating that at least one image is required in connection with assessment of a first type of components.

14. The method of clause 6, wherein receiving the indication that the unit is ready to be turned over comprises: receiving an indication from an electronic health records system that a current occupant of the unit has vacated the unit.

15. The method of clause 6, further comprising: receiving an indication that a second unit is ready to be turned over; determining, without user intervention, a priority for the unit and the second unit; and prompting a user of the remote computing device to prioritize the unit based on the priority.

16. The method of clause 15, wherein determining the priority for the unit and the second unit comprises: providing information associated with the unit to a machine learning model; providing information associated with the unit to the machine learning model; and receiving output from the machine learning model indicative of the priority for the unit and the second unit.

17. The method of clause 6, wherein the unit is a unit in a senior living facility, and the information about the average useful life of the first component in units similar to the unit comprises information about the average useful life of the first component in senior living facilities.

18. The method of clause 17, further comprising: receiving a request to create the template; receiving input indicating that the template is to be associated with senior living; in response to the input indicating that the template is to be associated with senior living, causing a preconfigured template associated with senior living to be presented; causing a plurality of types of components associated with the preconfigured template to be presented; and receiving input indicating that at least one image is required in connection with assessment of a first type of components.

19. The method of clause 6, further comprising: estimating a current condition of a second component based on the prior condition of the second component, a time that has elapsed since the prior condition of the second component, the information associated with the most recent resident of the unit, and information about an average useful life of the second component; determining, based on the estimated condition, that the second component is not due for replacement; and causing a recommendation to repair the second component to be presented to the user of the remote device based on the determination that the second component is not due for replacement.

20. The method of clause 19, further comprising: estimating a cost to replace the second component; estimating a cost to repair the second component; and determining that repair of the second component is recommended based on the estimated cost to replace the second component and the estimated cost to repair the second component.

21. The method of clause 6, further comprising: in response to receiving the input indicating that replacement of the first component is authorized, automatically generating an order for a replacement for the first component.

22. The method of clause 6, further comprising: in response to receiving the input indicating that replacement of the first component is authorized, automatically scheduling a third party service provider to replace the first component.

23. The method of clause 6, further comprising: receiving an indication that a second unit is ready to be turned over; generating a second customized user interface for assessment of the second unit based on the template; retrieving information about a prior condition of one or more components associated with the second unit, wherein the prior condition of each of the one or more components is associated with a time; receiving a request, from a remote computing device, for the customized user interface; causing the remote computing device to present the customized user interface, wherein the customized user interface is configured to: prompt a user of the remote computing device to provide input indicative of a current condition of the one or more components, and prompt the user of the remote computing device to capture an image of the first component of the one or more components; receiving, from the remote computing device, an image of the first component; estimating a current condition of the first component based on the prior condition of the first component, a time that has elapsed since the prior condition of the first component, the information associated with the most recent resident of the unit, and information about an average useful life of the first component in units similar to the unit; determining, based on the estimated condition, that the first component is due for replacement; in response to the determination that the first component is due for replacement, automatically authorizing replacement of the first component; causing a notification to be presented via the remote computing device indicating that replacement of the first component is authorized.

24. The method of clause 6, further comprising: causing the remote computing device to present, via the customized user interface, a user interface element that prompts a user to provide input indicative of the current condition of the first component; and causing the remote computing device to present, via the customized user interface, information indicative of a most recent replacement of the first component in connection with the user interface element that prompts a user to provide input indicative of the current condition of the first component.

25. The method of clause 6, further comprising: receiving, via the customized user interface, an indication that replacement of the first item has been completed; and causing a notification to be presented via a third remote computing device indicating that replacement of the first component has been completed.

26. The method of clause 25, wherein the third remote computing device is associated with a user affiliated with the facility.

27. The method of clause 6, further comprising: receiving, via the customized user interface, an indication that the unit is ready for occupancy; and causing a notification to be presented via a third remote computing device indicating that the unit is ready for occupancy.

28. The method of clause 6, further comprising: determining that repair of a second component associated with the unit is recommended; determining that a user associated with the remote computing device is capable of performing the repair of the second component; and prompting the user associated with the remote computing device to repair the second component.

29. The method of clause 6, further comprising: identifying a plurality of service providers capable of replacing the first component; selecting one or more of the plurality of service providers based on performance of the respective service provider in facilities similar to a facility associated with the unit.

30. The method of clause 6, further comprising: receiving a realized cost to replace the first component; cause the cost to be presented within the customized user interface; and cause a total cost associated with turning over the unit to be presented within the customized user interface, wherein the total cost includes one or more realized costs and one or more estimated costs.

31. A system for maintaining components of a unit, comprising: at least one processor that is configured to: perform a method of any of clauses 6 to 30.

32. A non-transitory computer-readable medium storing computer-executable code, comprising code for causing a computer to cause a processor to: perform a method of any of clauses 6 to 30.

It should be noted that, as used herein, the term mechanism can encompass hardware, software, firmware, or any suitable combination thereof.

It should be understood that the above described steps of the processes of FIGS. 5-7 can be executed or performed in any order or sequence not limited to the order and sequence shown and described in the figures. Also, some of the above steps of the processes of FIGS. 5-7 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

The invention claimed is:

1. A non-transitory computer-readable storage medium having instructions stored thereon that, when executed by at least one processor, cause the at least one processor to implement operations comprising:
    receiving an indication that a unit of a facility has been vacated or will be vacated within a time period by a first occupant of the unit of the facility;
    triggering an assessment for the unit of the facility for performing by a first user responsive to receiving the indication that the unit of the facility has been vacated or will be vacated within the time period by the first occupant of the unit of the facility;
    causing a customized user interface associated with the assessment to be presented to the first user via a first user device, the customized user interface being customized based on a template associated with the facility or with the unit of the facility and detailing a condition of the unit of the facility;
    identifying a task for completing to place the unit of the facility in condition for occupying by a second occupant different from the first occupant by evaluating the condition of the unit of the facility;
    determining that a contractor is not needed to complete the task, wherein the determining is based on a task type associated with the task and at least one of a skill level associated with a second user, a schedule associated with the second user, or an efficiency level associated with the second user, wherein the second user is an employee of the facility;
    in response to the determining, selecting the second user for completing the task to place the unit of the facility in condition for occupying by the second occupant;
    causing the customized user interface to simultaneously (i) present an identification of the task for completing to place the unit of the facility in condition for occupying by the second occupant, (ii) present an identification of the second user for completing the task, and (iii) allow the first user to approve or deny the selection of the second user for completing the task via the first user device prior to completion of the task;
    receiving a first input from the first user via the customized user interface presented via the first user device, the first input comprising a denial of the selection of the second user for completing the task to place the unit of the facility in condition for occupying by the second occupant;
    responsive to receiving the first input from the first user comprising the denial of the selection of the second user via the customized user interface presented via the first user device, determining that the contractor is needed to complete the task and selecting the contractor for completing the task to place the unit of the facility in condition for occupying by the second occupant based on the task type associated with the task and at least one of a skill level associated with the contractor, a schedule associated with the contractor, or an efficiency level associated with the contractor;
    causing the customized user interface to simultaneously (i) present the identification of the task for completing to place the unit of the facility in condition for occupying by the second occupant, (ii) present an identification of the contractor for completing the task, and (iii) allow the first user to approve or deny the selection of the contractor for completing the task via the first user device prior to completion of the task;
    receiving a second input from the first user via the customized user interface presented via the first user device, the second input comprising an approval of the selection of the contractor for completing the task to place the unit of the facility in condition for occupying by the second occupant; and
    responsive to receiving the second input from the first user comprising the approval of the selection of the contractor via the customized user interface presented via the first user device, causing a notification to be presented to the contractor via a second user device prior to completion of the task, the notification detailing an assignment of the contractor for completing the task.

2. The computer-readable medium of claim 1, the operations further comprising:
    identifying a product for purchasing to complete the task; and
    generating a purchase order for the product responsive to identifying the product for purchasing to complete the task.

3. The computer-readable medium of claim 2, the operations further comprising causing a third notification to be presented to a fourth user via a fourth user device, the third notification detailing the purchase order for the product.

4. The computer-readable medium of claim 3, operations further comprising:
    receiving a fourth input comprising an approval of the purchase order for the product from the fourth user via the fourth user device; and submitting the purchase order to a supplier responsive to receiving the fourth input from the fourth user via the fourth user device.

5. The computer-readable medium of claim 3, wherein causing the third notification to be presented to the fourth user via the fourth user device comprises causing the third notification to be presented to the fourth user via the fourth user device responsive to determining that a cost associated with the purchase order for the product exceeds a threshold.

6. The computer-readable medium of claim 1, the operations further comprising:
   identifying a second task for completing to place the unit of the facility in condition for occupying by the second occupant by evaluating the condition of the unit of the facility;
   selecting a third user different from the second user for completing the second task to place the unit of the facility in condition for occupying by the second occupant based on a task type associated with the second task and at least one of a skill level associated with the third user, a schedule associated with the third user, or an efficiency level associated with the third user wherein the third user is part of the internal staff that is associated with the facility;
   causing the customized user interface to simultaneously (i) present an identification of the second task for completing to place the unit of the facility in condition for occupying by the second occupant, (ii) to present an identification of the third user for completing the second task, and (iii) allow the first user to approve or deny the selection of the third user for completing the second talkie the first user device prior to completion of the task;
   receiving a third input from the first user via the customized user interface presented via the first user device, the third input comprising an approval of the selection of the third user for completing the second task to place the unit of the facility in condition for occupying by the second occupant; and
   responsive to receiving the third input from the first user comprising the approval of the selection of the third user via the customized user interface presented via the first user device, causing a second notification to be presented to the third user via a third user device different from the second user device, the second notification detailing an assignment of the third user for completing the second task.

7. The computer-readable medium of claim 6, wherein:
   the notification detailing the assignment of the contractor for completing the task includes a third time period that is scheduled for the contractor to complete the task; and
   the second notification detailing the assignment of the third user for completing the second task includes a fourth time period that is scheduled for the third user to complete the second task.

8. The computer-readable medium of claim 1, the operations further comprising:
   receiving an indication that the task has been completed by the contractor; and
   responsive to receiving the indication that the task has been completed by the contractor, causing a fourth notification to be presented to a fifth user via a fifth user device, the fourth notification indicating that the unit of the facility is ready for occupancy by the second occupant.

9. The computer-readable medium of claim 1, wherein selecting the second user for completing the task based on the skill level associated with the second user comprises evaluating a work history associated with the second user, the work history detailing a plurality of tasks performed previously by the second user within a second time period.

10. The computer-readable medium of claim 1, wherein triggering the assessment for the unit of the facility responsive to receiving the indication that the unit of the facility has been vacated or will be vacated by the first occupant within the time period comprises receiving the indication that the unit of the facility has been vacated or will be vacated within the time period by the first occupant from an electronic health records system.

11. The computer-readable medium of claim 1, the operations further comprising:
   receiving a fifth input from the first user via the first user device comprising at least one of a note or an image associated with the unit of the facility; and
   determining the condition of the unit of the facility based on the fifth input.

12. The computer-readable medium of claim 1, wherein causing the customized user interface to simultaneously (i) present the identification of the task for completing to place the unit of the facility in condition for occupying by the second occupant, (ii) present the identification of the second user for completing the task, and (iii) allow the first user to approve the selection of the second user for completing the task via the first user device prior to completion of the task is responsive to determining that a cost associated with the task exceeds a threshold.

13. The computer-readable medium of claim 1, the operations further comprising:
   retrieving information about a component associated with the unit of the facility;
   retrieving information about a length of occupancy associated with the first occupant; and
   determining, based on the information about the component and the information about the length of occupancy associated with the first occupant, whether the component is due for replacement or repair;
   wherein selecting the contractor for completing the task comprises selecting the contractor based on whether the component is due for replacement or repair.

14. The computer-readable medium of claim 13, the operations further comprising estimating a first cost that is associated with the component based on whether the component is due for replacement or repair, wherein selecting the contractor for completing the task comprises selecting the contractor for completing the task based on the first cost and a second cost that is associated with selecting the contractor for completing the task.

15. The computer-readable medium of claim 1, wherein the notification details a product that has been ordered for completing the task and an estimated delivery date for the product, the operations further comprising scheduling a time for the contractor to complete the task based on the estimated delivery date for the product.

16. The computer-readable medium of claim 15, wherein the notification details a delay associated with the estimated delivery date for the product and prompts the contractor to consider an alternative product for completing the task.

17. The computer-readable medium of claim 1, wherein the notification details a product that has been procured for the task and instructions for obtaining the product.

18. The computer-readable medium of claim 1, wherein selecting the contractor for completing the task comprises selecting the contractor for completing the task based on an estimated cost associated with selecting the contractor for completing the task.

19. A computer-implemented method, comprising:
receiving an indication that a unit of a facility has been vacated or will be vacated within a time period by a first occupant of the unit of the facility;
triggering an assessment for the unit of the facility for performing by a first user responsive to receiving the indication that the unit of the facility has been vacated or will be vacated within the time period by the first occupant of the unit of the facility;
causing a customized user interface associated with the assessment to be presented to the first user via a first user device, the customized user interface being customized based on a template associated with the facility or with the unit of the facility and detailing a condition of the unit of the facility;
identifying a task for completing to place the unit of the facility in condition for occupying by a second occupant different from the first occupant by evaluating the condition of the unit of the facility;
determining that a contractor is needed to complete the task, wherein the determining is based on a task type associated with the task and at least one of a skill level associated with the contractor or a schedule associated with the contractor;
in response to the determining, selecting the contractor for completing the task to place the unit of the facility in condition for occupying by the second;
causing the customized user interface to simultaneously (i) present an identification of the task for completing to place the unit of the facility in condition for occupying by the second occupant, (ii) present an identification of the contractor for completing the task, and (iii) allow the first user to approve or deny the selection of the contractor for completing the task via the first user device prior to completion of the task;
receiving a first input from the first user via the customized user interface presented via the first user device, the first input comprising a denial of the selection of the contractor for completing the task to place the unit of the facility in condition for occupying by the second occupant;
responsive to receiving the first input from the first user comprising the denial of the selection of the contractor via the customized user interface presented via the first user device, determining that the contractor is not needed to complete the task and selecting a second user for completing the task to place the unit of the facility in condition for occupying by the second occupant based on the task type associated with the task and at least one of a skill level associated with the second user or a schedule associated with the second user, wherein the second user is an employee of the facility;
causing the customized user interface to simultaneously (i) present the identification of the task for completing to place the unit of the facility in condition for occupying by the second occupant, (ii) present an identification of the second user for completing the task, and (iii) allow the first user to approve or deny the selection of the second user for completing the task via the first user device prior to completion of the task;
receiving a second input from the first user via the customized user interface presented via the first user device, the second input comprising an approval of the selection of the second user for completing the task to place the unit of the facility in condition for occupying by the second occupant; and
responsive to receiving the second input from the first user comprising the approval of the selection of the second user via the customized user interface presented via the first user device, causing a notification to be presented to the second user via a second user device prior to completion of the task the notification detailing an assignment of the second user for completing the task.

20. The method of claim 19, further comprising:
retrieving information about a component associated with the unit of the facility;
retrieving information about a length of occupancy associated with the first occupant; and
determining, based on the information about the component and the information about the length of occupancy associated with the first occupant, that the component is due for replacement or repair;
wherein selecting the contractor for completing the task comprises selecting the contractor responsive to determining that the component is due for replacement or repair.

21. The method of claim 20, further comprising estimating a first cost that is associated with replacing or repairing the component, wherein causing the customized user interface to simultaneously (i) present the identification of the task for completing to place the unit of the facility in condition for occupying by the second occupant, (ii) present the identification of the contractor for completing the task, and (iii) allow the first user to approve or deny the selection of the contractor for completing the task via the first user device prior to completion of the task is based on the first cost and a second cost that is associated with selecting the contractor for completing the task.

22. A system comprising:
one or more processors; and
one or more non-transitory computer readable storage media having instructions stored thereon that, when executed by the one or more processors, cause the one or more processors to implement operations comprising:
receiving an indication that a unit of a facility has been vacated or will be vacated within a time period by a first occupant of the unit of the facility;
triggering an assessment for the unit of the facility for performing by a first user responsive to receiving the indication that the unit of the facility has been vacated or will be vacated within the time period by the first occupant of the unit of the facility;
causing a customized user interface associated with the assessment to be presented to the first user via a first user device, the customized user interface being customized based on a template associated with the facility or with the unit of the facility and detailing a condition of the unit of the facility;
identifying a task for completing to place the unit of the facility in condition for occupying by a second occupant different from the first occupant by evaluating the condition of the unit of the facility;
determining that a contractor is not needed to complete the task, wherein the determining is based on a task type associated with the task and a skill level associated with a second user, wherein the second user is an employee of the facility;

in response to the determining, selecting the second user for completing the task to place the unit of the facility in condition for occupying by the second occupant;

causing the customized user interface to simultaneously (i) present an identification of the task for completing to place the unit of the facility in condition for occupying by the second occupant, (ii) present an identification of the second user for completing the task, and (iii) allow the first user to approve or deny the selection of the second user for completing the task via the first user device prior to completion of the task;

receiving a first input from the first user via the customized user interface presented via the first user device, the first input comprising a denial of the selection of the second user for completing the task to place the unit of the facility in condition for occupying by the second occupant;

responsive to receiving the first input from the first user comprising the denial of the selection of the second user via the customized user interface presented via the first user device, determining that the contractor is needed to complete the task and selecting the contractor for completing the task to place the unit of the facility in condition for occupying by the second occupant based on the task type associated with the task and a skill level associated with the contractor;

causing the customized user interface to simultaneously (i) present the identification of the task for completing to place the unit of the facility in condition for occupying by the second occupant, (ii) present an identification of the contractor for completing the task, and (iii) allow the first user to approve or deny the selection of the contractor for completing the task via the first user device prior to completion of the task;

receiving a second input from the first user via the customized user interface presented via the first user device, the second input comprising an approval of the selection of the contractor for completing the task to place the unit of the facility in condition for occupying by the second occupant; and responsive to receiving the input from the first user comprising the approval of the selection of the contractor via the customized user interface presented via the first user device, causing a notification to be presented to the contractor via a second user device prior to completion of the task, the notification detailing an assignment of the contractor for completing the task.

23. The system of claim 22, wherein selecting the contractor for completing the task comprises selecting the contractor for completing the task based on an estimated cost associated with selecting the contractor for completing the task.

* * * * *